United States Patent [19]
Zucker et al.

[11] Patent Number: 5,384,798
[45] Date of Patent: Jan. 24, 1995

[54] PHOTOCONDUTIVELY CONTROLLED ELECTRO-OPTIC LASER MODULATION

[75] Inventors: Oved S. F. Zucker, Del Mar; Iain A. McIntyre, Vista; Paul J. Solone, Cardiff-by-the-Sea; David Giorgi, Encintas, all of Calif.

[73] Assignee: Energy Compression Research Corp., San Diego, Calif.

[21] Appl. No.: 985,144

[22] Filed: Dec. 3, 1992

[51] Int. Cl.$^6$ ............................................. H01S 3/10
[52] U.S. Cl. ..................................... 372/26; 372/38; 372/12; 372/98; 372/21; 372/27; 372/10; 372/106; 372/92; 372/18; 372/25; 372/37; 372/82
[58] Field of Search ............... 372/10, 12, 26, 38, 372/21, 18, 25, 87, 92, 98, 106, 27, 82

[56] References Cited

U.S. PATENT DOCUMENTS

| | | | |
|---|---|---|---|
| 3,917,943 | 11/1975 | Auston | 250/211 |
| 4,752,931 | 6/1988 | Dutcher et al. | 372/18 |
| 4,841,528 | 6/1989 | Sipes, Jr. et al. | 372/22 |
| 4,965,803 | 10/1990 | Esterowitz et al. | 372/5 |
| 5,001,716 | 3/1991 | Johnson et al. | 372/10 |
| 5,111,466 | 5/1992 | Normandin et al. | 372/22 |
| 5,155,620 | 10/1992 | Gordon et al. | 372/21 |
| 5,268,912 | 12/1993 | Tatsuno et al. | 372/21 |

OTHER PUBLICATIONS

GHC New, Optics Sec., Dept. Phys., Imperial Col. of Science & Tech., "The generation of ultrashort laser pulses", Rep. Prog. Phys., vol. 46, 1983, pp. 877–879.

R. B. Chesler & D. Maydan, "Calculation of Nd:YA1G Cavity Dumping, Journal of Applied Physics", vol. 42, No. 3, Mar. 1, 1971, pp. 1028–1030.

Adelbert Owyoung, et al., "Gain switching of a monolithic single–frequency laser–diode–excited Nd:YAG laser", Optics Letters, vol. 10, No. 10, Oct. 1985, pp. 484–486.

Arthur A. Vuylsteke, "Theory of Laser Regeneration Switching", Journal of Applied Physics, vol. 34, No. 6, Jun. 1963, pp. 1615–1622.

I. P. Alcock and A. I. Ferguson, "Mode-Locking And O-Switching Of An Optically Pumped Miniature Nd$^{3+}$:YAG Laser", Optics Communications, vol. 58, No. 6, pp. 417–419 15 Jul. 1986.

Amado Cordova-Plaza, et al., "Miniature CW and Active Internally Q–Switched ND:MgO:LinbO$_3$ Lasers", IEEE Journal of Quantum Electronics, vol. QE-23, No. 2, Feb. 1987, pp. 262–266.

(List continued on next page.)

*Primary Examiner*—Leon Scott, Jr.
*Attorney, Agent, or Firm*—Marks & Murase

[57] ABSTRACT

The optical modulator of the invention comprises an electro-optic material or magneto-optic material EOD which modulates optical energy in accordance with an applied electromagnetic waveform. The electromagnetic waveform impressed in the EOD is controlled by a light activated switch, or switches, which varies the magnitude of the electromagnetic waveform to the EOD by switching portions of a transmission line (of which the EOD forms all or at least a part of the dielectric) in or out. The switch, or switches, may be configured between segments of one of the conductors of the transmission line and may overlay the electro-optic dielectric material. The transmission line may include a plurality of sections, each charged to a selected voltage, so that when switched by said light activated switches, the electromagnetic waveform to the EOD is controlled. When used in a laser cavity, the optical modulator can control the output of the laser cavity in response to optical input control signals. The optical modulator may be used for Q-switching the laser cavity, mode-locking the laser, cavity dumping the laser cavity, or modulating the output of the laser cavity, or combinations of the above. The optical input control signal may comprise light from within the laser cavity, from the output of the cavity, or from an external source. The optical modulator may modulate a plurality of beams of optical energy based upon a single electromagnetic waveform or it may modulate the plurality of beams in accordance with a respective plurality of different waveforms.

198 Claims, 12 Drawing Sheets

OTHER PUBLICATIONS

D. H. Auston, "Picosecond optoelectronic switching and gating in silicon", Appl. Phys. Lett., vol. 20, No. 3, Feb. 1, 1975, pp. 101–103.

Jean-Marc Heritier and Dave Scerbak, "Electro-Optically Q-Switched, Diode Laser-Pumped Solid-State Laser for Short Pulse Generation", Jt. Project: Quatel Intl., Inc. & Electro-Optics Tech., Inc., Proceedings of Conference In Lasers and Electro-Optics (CLEO) (1989) (19 pages).

W. Sibbett Margulus and J. R. Taylor, "Active Mode-Locking of Lasers Using GaAs and GaP Picosecond Switches", Optics Communications, vol. 35, No. 1, Oct. 1980, pp. 153–156.

P. LeFur and D. H. Auston, "A kilovolt picosecond optoelectronic switch and Pockel's cell", (1975) (3 pages).

G. Mourou and W. Knox, "High-power switching with picosecond precision", Appl. Phys. Lett. vol. 35, No. 7, Oct. 1, 1979, pp. 492–494.

J. Agostinelli, et al., "Active pulse shaping in the picosecond domain", Appl. Phys. Lett., vol. 35, No. 10, Nov. 15, 1979, pp. 731–734.

Chen Shaohe, et al., "A Novel Mode-Selecting and Q-Switching Technique", IEE Journal of Quantum Elec., vol. 28, No. 11, Nov. 1992, pp. 2556–2559.

C. J. Norrie, et al., "Single-Frequency Operation of Diode-Laser-Array Transverse-Pumped Q-Switched Nd:YAG Laser", Electronics Letters, vol. 25, No. 17, (1989–1990), pp. 1115 and 1116.

R. W. Hellwarth, "Control of Fluorescent Pulsations", from Advances In Electronics, Col. U, Press (1961).

Tso Yee Fan and Robert L. Byer, "Diode Laser-Pumped Solid-State Lasers", IEE Journ. of Quantum Elec., vol. 24, No. 6, Jun. 1988, pp. 895–912.

TIME

TIME

PHOTOCONDUTIVELY CONTROLLED ELECTRO-OPTIC LASER MODULATION

BACKGROUND OF THE INVENTION

1. Field of the Invention

The present invention generally relates to an apparatus and method for modulating optical energy and, more particularly, to an apparatus and method for photoconductively controlling the optical energy, e.g., within a laser cavity. The present invention further relates to a control system and method for controlling a laser system to enable the system to perform Q-switching, mode-locking and/or cavity dumping. The present invention also relates to an apparatus for the production of short laser radiation pulses using cavity dumping techniques.

2. Description of Prior Art

Optical modulators, used, e.g., to control the output of lasers, are generally controlled by electrical signals. The limitation on the application of an electrical signal to a modulator in terms of speed, multiple pulse switching, volume, etc., have a direct consequence on the performance of laser systems. The present invention can be employed in lasers to generate optical pulses of large power (e.g., multi-megawatt) which have an extremely short duration (e.g., less than one ns). This is a regime of operation which has not previously been addressed by laser systems. The present invention also enables mode-locking and cavity dumping, resulting in the generation of optical pulses in the picosecond regime.

Several methods have been developed for producing pulses from lasers in a controlled manner, including Q-switching, mode-locking, cavity dumping, gain switching, self-injection and various combinations of these methods.

Conventional optically pumped solid state lasers produce pulses through one of several processes. As described by R. W. Hellwarth ("Advances in Quantum Electronics," 1961) Q-switching involves raising the cavity Q from low to high when there is a maximum population inversion in the active medium. This produces a pulse with a typical duration of a few round-trip transit times of the laser cavity. Mode-locking, where several longitudinal cavity modes are locked together in phase, creating a temporal interference such that the laser produces pulses at a rate equal to the inverse of the round-trip transit time of the laser cavity, and with a duration of some small fraction of the cavity round-trip transit time, is described by G. H. C. New, "The Generation of Ultrashort Pulses," Rep. Prog. Phys.46 877 (1983). Cavity dumping, where the cavity Q is decreased from a high value, (i.e., where the circulating optical power is high) to a low value (i.e., where the circulating optical power can quickly escape from the laser cavity) is described by R. B. Chesler, et al., J. Appl. Phys. 42 1028 (1971). If the laser is not mode-locked, the pulse lengths produced in this method can be as short as the laser cavity round-trip transit time and, if the laser is mode-locked, considerably shorter. Gain switching is described by A Owyoung, et al., "Gain Switching of a Monolithic Single Frequency Laser-Diode-Excited Nd:YAG Laser," Optics Lett 10 484 (1985), in which the gain of the laser is quickly increased to a high level through pulsed pumping. The intracavity radiation level quickly builds up to saturate the gain in the laser and then escapes. Typical pulse lengths can be a few laser cavity round-trip transit times.

"Self-injection" or "cavity-flipping" involves the use of a polarization modulator "flipping" the polarization of the intracavity radiation in a laser in order to generate a pulse whose duration is less than the cavity round trip time, as described by C. H. Brito-Cruz, et al., "The Self-Injected Nonmode-locked Picosecond Laser," IEEE Journal Quant Electron QE-19 573, (1983). This pulse is then regeneratively amplified before being dumped out. During the amplification process, pulse shortening techniques may be applied to reduce the pulse from the nanosecond regime to the picosecond regime.

Pulse transmission mode ("PTM"), where the cavity Q is kept low to build up a large gain in the active medium and is then switched high to transfer the stored energy into the optical field, is described by A. A. Vuylsteke, "Theory of Laser Regeneration Switching," J. Appl. Phys. 34 1615 (1963). At the point of maximum optical field, the cavity Q is reduced to a low value to allow the optical energy to escape quickly. This technique can be viewed as a combination of Q-switching and cavity dumping.

Microchip lasers, such as that described by A. Mooradian in U.S. Pat. No. 4,860,304, can be operated in a Q-switched mode, as described by J. J. Zayhowski and A. Mooradian in U.S. Pat. No. 5,132,977, which results in the generation of pulses shorter than 300 ps in duration. These Q-switched pulses are considerably shorter than conventional Q-switched lasers due to their extreme short length, around 1 mm. However, the energy output from this type of laser is severely restricted due to the small volume of active material employed. Operation of arrays of microchip lasers, described by A. Mooradian in U.S. Pat. No. 5,115,445, will result in an increase of the total pulse energy to the level of a few millijoules. The current invention will enable many millijoules to be generated in the subnanosecond regime. The microchip laser in its present form does not, however, generate pulses in the few picosecond regime achievable by mode-locked lasers.

Conventionally, electro-optic modulators have been used in systems to control optical beams in applications such as signal modulation for optical communication and in the control of solid state lasers. When controlling solid state lasers, electro-optic modulators have been used in systems which enable Q-switching, cavity dumping, or mode-locking of the lasing system. Present electro-optic modulators, however, must be configured for each application, e.g., Q-switching, cavity dumping, or mode-locking. To perform a different applications, the configuration of the modulator and its associated system must be altered.

The most common form of intracavity electro-optic modulation is Q-switching with a system that uses, for example, a Pockels cell. In a pulse reflection mode, i.e. normal Q-switching, the Pockels cell is used to change the cavity Q once during a pulse sequence. Other applications using a Pockels cell may also require the voltage applied to the Pockels cell to be turned on and off. These other applications include pulse transmission mode operation ("PTM"), pulse slicing, optical gating, and single pulse selection. An advantage of PTM (cavity dumped) operation is that the duration of the optical pulse is limited by the cavity length, whereas the duration of a Q-switched pulse is determined by the gain characteristics and cavity decay time. Various approaches have been employed to provide turn-on and turn-off capabilities using a Pockels cell, including the use of two krytrons or a microwave tube. These approaches, however, are limited as to risetime, repetition rate and lifetime, or require complicated, switched power supplies.

As disclosed in U.S. Pat. No. 3,917,943 to Auston, it is recognized that a photoconductive switch is a relatively fast, electrical switching device. The use of a photoconductive switch to control a Pockels cell to achieve a risetime of 25 ps was disclosed by LeFur, et al. in Appl. Phys. Lett. 28 21 (1976), and further detailed in Mourou and Knox, Appl. Phys. Lett 35 492 (1979) and Agoibaelli, et al., Appl. Phys. Lett 35 731 (1979).

Margulis, et al. in Optics Comm. 35 153 (1980) disclosed a photoconductive switch controlling a Pockels cell to actively mode-lock a coumarin dye laser. The signal for controlling a GaAs photoconductive switch was obtained from a second mode-locked laser. The short carrier lifetime of 100 ps allowed the Pockels cell to recover during the 5 ns round-trip transit time. Another application of photoconductive switch control discussed by M. J. P. Payne and M. W. Evans, Paper TUB16, Proceedings of Confr. on Lasers & Optics, 1984 Anaheim, Calif., was the use of negative feedback to extend the pulse length of a Q-switched Nd:YAG laser. In this case, 10% of the intracavity radiation was extracted via a beam splitter to activate a photoconductive switch, which controlled the Pockels cell voltage.

Use of a Pockels cell as a phase retarding element in a tunable Q-switched laser is known from U.S. Pat. No. 5,001,716. Also, a Q-switched solid-state laser structure is known from U.S. Pat. No. 4,965,803. A cavity-dumped laser using feedback is known from U.S. Pat. No. 4,841,528. Finally, the use of a pulser for pulsing a Q-switch within a laser cavity is known from U.S. Pat. No. 4,752,931.

SUMMARY OF THE INVENTION

It is an object of the present invention to provide an apparatus and method modulating optical energy in accordance with at least one and preferably several optical control signals.

It is also an object of the present invention to provide an optical-to-optical modulator and method for varying the modulated output in accordance with at least one and preferably several voltage sources.

It is another object of the present invention to provide a lasing system having an optical-to-optical modulator for controlling the laser cavity in accordance with optical energy from within and/or external to the laser cavity.

It is a further object of the present invention to provide a lasing system and method using an optical-to-optical modulator to produce a combination of one or more of Q-switching, mode locking and/or cavity dumping operations to control the optical energy within a laser cavity.

It is yet a further object of the invention to provide a lasing system and method for generating high power laser pulses of short (e.g., sub-nanosecond) duration.

It is yet a further objective of the invention to provide a method and apparatus for producing an output pulse from a laser system, where the pulse characteristics (e.g., amplitude, width, modulation, etc.) can all be varied based on arbitrary, selectable Q-control.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objectives, in accordance with the present invention, as embodied and broadly described herein, the optical-to-optical modulator of the invention comprises an electro-optic material, which may include a magneto-optic material, operable to modulate optical energy in accordance with an applied electromagnetic waveform. The electromagnetic waveform is preferably produced by activating at least one, and preferably two or more, light activated switches using one or more optical input control signals. Preferably, the electro-optic material forms part of a dielectric of a transmission line and, together with the light activated switches, is in the form of a distributed transmission line.

In another embodiment of the invention, the optical-to-optical modulator is placed within a lasing system to selectively control the output of the lasing system. When used within the lasing system, the optical-to-optical modulator may be selectively controlled in order to perform one or more of the following: Q-switching the laser cavity, mode-locking the laser cavity, cavity dumping the laser cavity, or modulating the output of the laser cavity. The optical-to-optical modulator may be controlled with at least one optical input control signal or with at least one variable voltage source connected to the transmission line.

BRIEF DESCRIPTION OF THE DRAWINGS

The accompanying drawings, which are incorporated in and form a part of the specification, illustrate embodiments of the present invention and, together with the description, serve to explain the principles of the invention. Similar devices depicted in the various drawings are labeled using similar reference numerals, e.g., reference numeral 38 (FIG. 3), 48 (FIG. 4), etc. In the drawings.

DETAILED DESCRIPTION OF THE PREFERRED EMBODIMENTS

Reference will now be made in detail to the presently preferred embodiments of the invention, examples of which are illustrated in the accompanying drawings.

Figure 1:
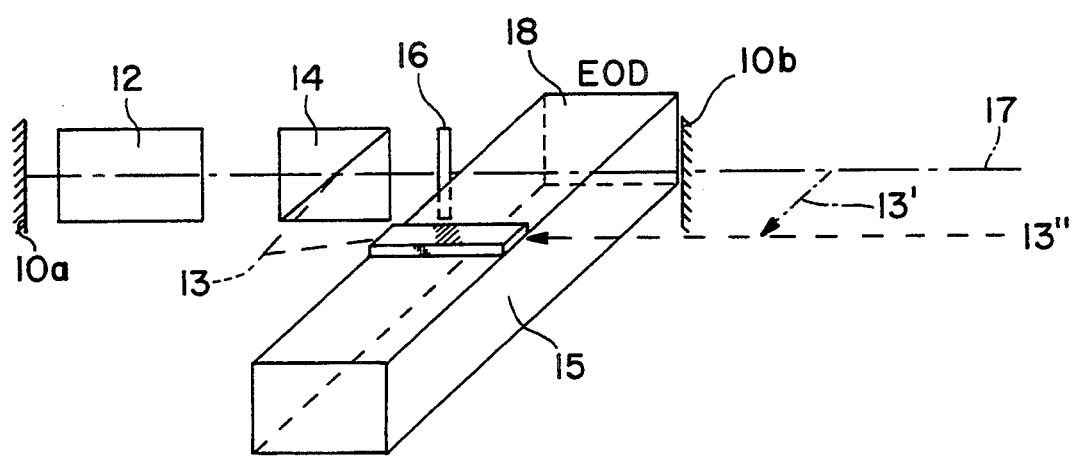
FIG. 1 is a schematic representation of a laser cavity with an optical-to-optical modulator.

An example of a laser cavity incorporating an optical-to-optical modulator according to the present invention, is illustrated in FIG. 1. In the embodiment of FIG. 1, an active laser medium 12 is contained within a Fabry-Perot cavity, or the like, formed by two end mirrors 10a and 10b, each of which has a high reflection coefficient at the lasing wavelength. Preferably, the mirror 10a is a total reflection mirror, and the mirror 10b is an output mirror, typically having a reflectivity of 10–90% The active medium in the cavity 12 of the laser is preferably, for example, Nd:YAG. However, as will be appreciated by the artisan, other types of active lasing media, such as any solid state, gas, or liquid types of active medium, may be used instead of the Nd:YAG active medium. Although the cavity shown in FIG. 1 is formed between two mirrors 10a and 10b, other cavity arrangements, such as a ring configuration, may be used. The laser cavity also contains an electro-optical device (EOD) 18, for example a Pockels cell, to enable the laser to Q-switch, and preferably may include a polarizer 14. The laser cavity may also contain a quarter wave retardation plate, 16, or the EOD may be pre-biased to produce quarter wave retardation. The polarizer 14 may be inserted in the laser either before (as illustrated) or after (not illustrated) the EOD 18.

An important feature of the invention is that the optical-to-optical modulator must be controllable to enable the laser cavity to perform a variety of functions. In order to accomplish this, the EOD 18 is, as described in more detail below, controllable by an optical signal derived from within the laser cavity, e.g., signal 13, or external to the laser cavity, e.g., signal 13′ taken from an output of the laser system, a signal taken from an external source, e.g., signal 13″. It should be understood that the EOD 18 may take the form of devices other than Pockels cells, for example, Kerr cells, tunable Fabry-Perot filters, or switched Faraday rotators may also be used. A control device is described in detail below, responsive to the control signals, used to control the EOD 18 to modulate the light energy passing along the lasing axis 17.

Figure 2A:
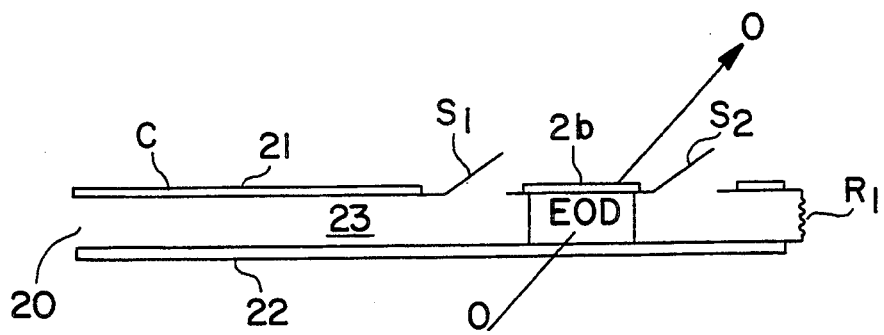
FIGS. 2(a), 2(b) and 2(c) are schematic representations of embodiments of an optical-to-optical modulator.
Figure 2B:
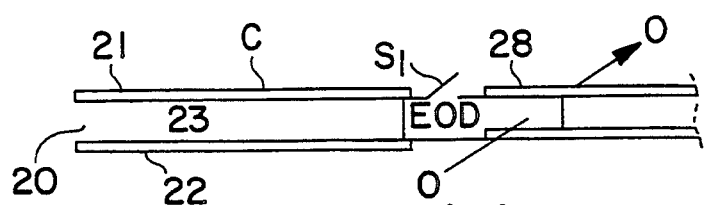
Figure 2C:
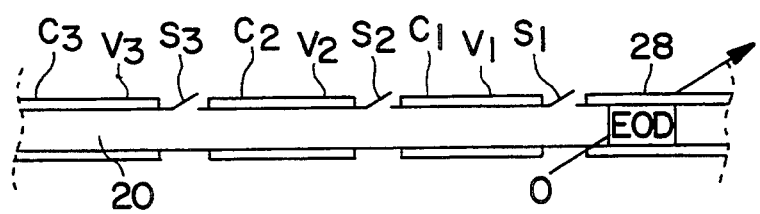

Examples of the type of circuits and signals used to control the EOD 18 are illustrated in FIGS. 2(a), 2(b) and 2(c).

In the example illustrated in FIG. 2(a), the control circuit is configured in the form of a transmission line 20 having at least one light activated switch $S_1$ connected between a C of the transmission line 20 and the electro-optic device 28. The transmission line comprises conductive layers 21 and 22 separated by a dielectric 23. The conductive layer 21 is "interrupted" at the locations of the switches $S_1$ and $S_2$. As will now become apparent to the artisan, the portion C of the transmission line 20 is preferably in the form of a capacitor, which is precharged with a voltage so that when an optical input control signal is received at the light activated switch $S_1$ to "close" the switch $S_1$, an electromagnetic waveform travels across the electro-optic device 28. The electro-optic device 28 which is formed of an electro-optic material is used as the transmission line dielectric in the region of the transmission line where the optical beam to be modulated passes through the dielectric region of the transmission line. Advantageously, from a fabrication standpoint and for permitting the modulation of a plurality of separate beams O using different portions of the transmission line dielectric, the electro-optic material may extend beyond the region of the EOD 28 indicated in FIG. 2(a) and form all or a part of the remainder of the dielectric 23 as illustrated in FIG. 2(e). Preferably, the light activated switches $S_1$ and $S_2$ are formed on the conductive layer 21 of the dielectric material to provide an integral, distributed transmission line, control switch (or switches) and modulator. Such a configuration eliminates the relatively slow switching and signal propagation times associated with prior devices, and facilitates the use of an arbitrarily large number of light activated switches and transmission lines segments, which makes the output light modulation achievable by the present invention virtually arbitrarily selectable.

In order to minimize the rise-time of the electromagnetic waveform, it is advantageous if the transmission line 20 is impedance matched to the electro-optic device 28. Preferably the switch $S_1$ is a photo-conductive semiconductor switch which can be activated by any of several means, e.g., another laser, an LED, etc. Reference should be to U.S. Pat. No. 5,109,203 for details regarding such switching.

The light activated switch may have linear or non-linear characteristics. Light activated switches having non-linear characteristics, include avalanche or lock-on devices. Also, the light activated switches may be bulk or junction devices, with the junction devices comprising both devices having a single junction and devices having a plurality of junctions.

The electromagnetic waveform from the charge on the capacitor portion C creates an electromagnetic field across the electro-optic device which thereby controls the modulation of the optical energy. Thus, by selectively controlling the optical input control signal and the pre-charged voltage on the transmission line 20, the optical energy may be selectively modulated.

The optical-to-optical modulator, according to the invention, will typically use several light activated switches for controlling the electromagnetic waveform. For example, as shown in FIG. 2(a), a second light activated switch $S_2$ may be connected to the other side of the electro-optic device 28 and to a discharge load $R_1$. If the shorting switch $S_2$ is activated a short time after switch $S_1$ is closed, the electrical energy in the EOD 28 will be dumped in the load $R_1$. More generally, the first light activated switch $S_1$ may be activated to generate and transmit an electromagnetic waveform across the electro-optic device 28 and the second light activated switch $S_2$ may thereafter be activated to alter the electromagnetic waveform. For the particular cavity configuration of FIG. 1, closing the shorting switch results in the optical energy being coupled out of the cavity from the polarizer 14.

Figure 3A:
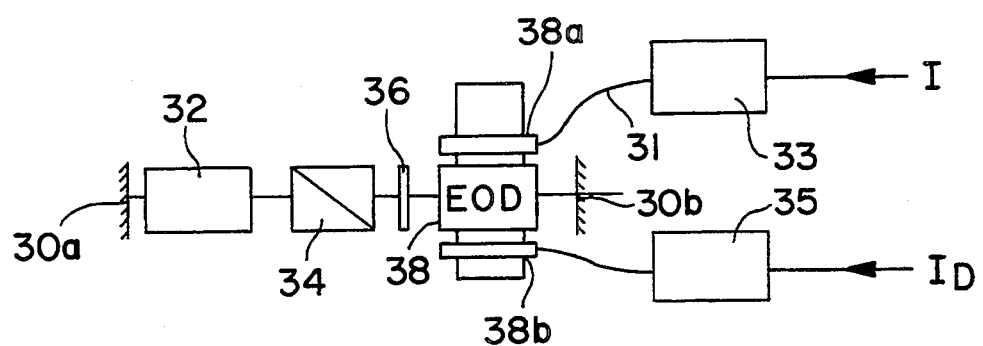
FIGS. 3(a) and 3(b) are schematic representations of embodiments of devices for activating the light activated switches of the optical-to-optical modulator.

As alluded to above, the shorting switch $S_2$ is preferably a photoconductive semiconductor switch, and more preferably a junction-type switch. The switch $S_2$ may be activated by any of several devices, two examples being illustrated in FIGS. 3a and 3b. In FIG. 3a, the switches $S_1$ and $S_2$, are separately activated by individual laser diodes 33 and 35, respectively. In this case, the timing between the closing of the switches $S_1$ and $S_2$ is controlled by the current pulses I and $I_D$, which drive the laser diodes 33 and 35, respectively.

Figure 3B:
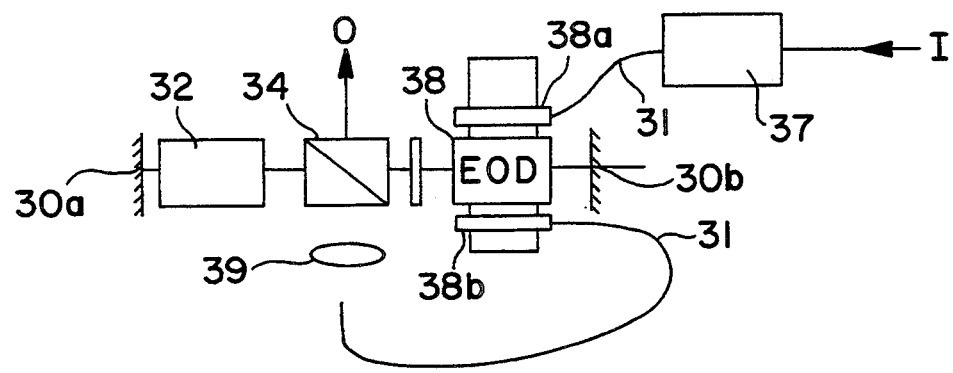
Figure 4A:
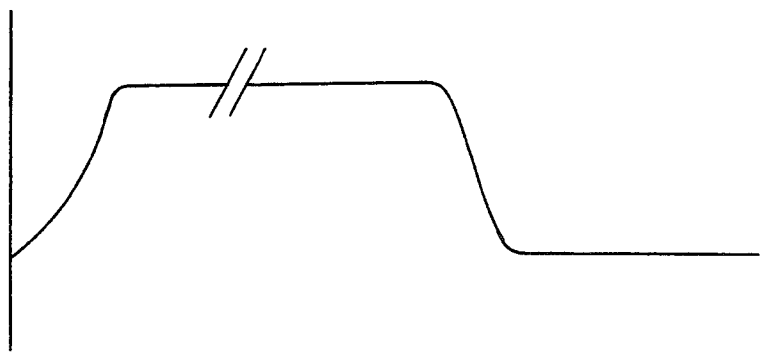
FIG. 4 is a timing chart illustrating the timing of various processes within a laser cavity.
Figure 4B:
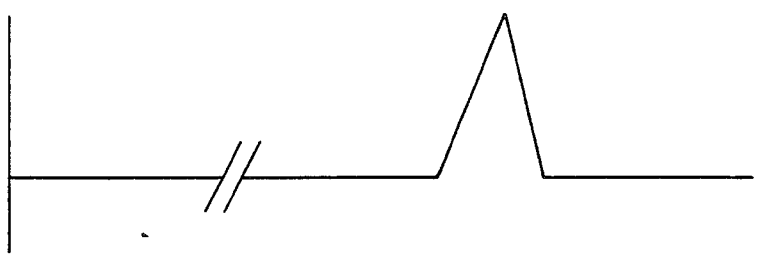
Figure 4C:
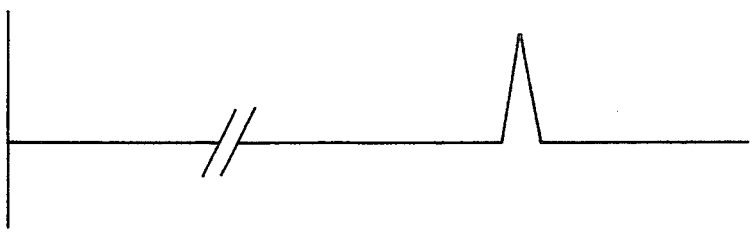
Figure 4D:
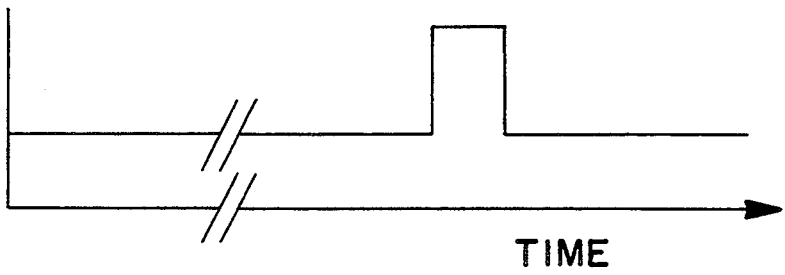

In the embodiment of FIG. 3b, switch $S_1$ is activated by external laser diode 37, while switch $S_2$ is activated by optical radiation leaking out of the lasing cavity. Therefore, only one external electrical signal I is used to "control" the EOD 38. In this latter configuration, the leakage light is obtained from any suitable optical component, e.g., leakage off the polarizer due to birefringence in the active medium, or leakage through one of the cavity mirrors. The leakage light can be directed to $S_2$ by, e.g., mirrors or an optical fiber 31. FIG. 3b illustrates leakage from the polarizer 34 being focused by a lens 39 into a fiber 31, which illuminates the switch $S_2$. Since the optical energy in the leakage light is directly proportional to the optical energy of the intracavity radiation, the leakage peaks when the intracavity energy peaks. Switch $S_2$ is activated, i.e., closes, and removes the voltage from the EOD 38, thus reducing the cavity Q and the intracavity radiation is allowed to exit in a very short time. For the particular cavity configuration suggested above, the radiation O exits from the polarizer 34 in the direction shown by the arrow.

Figure 2D:
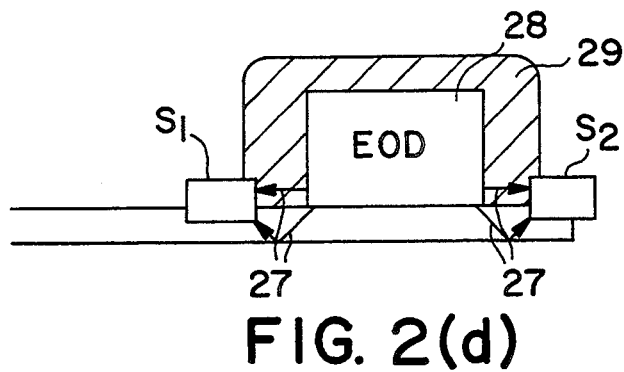
FIG. 2(d) is a representation of a portion of the circuit of FIG. 2(a) illustrating use of substrate structure as a light guide.
Figure 2E:
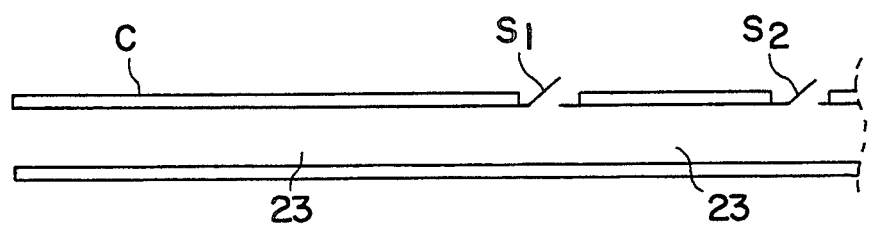
FIG. 2(e) is a representation of the circuit of FIG. 2(a) in which the transmission line dielectric is composed of opto-electric material.

An exemplary structure for using "leakage" light from one switch, $S_1$, to close another switch, $S_2$, is depicted in FIG. 2(d), wherein a substrate 29 is used as a light guide for leakage path 27. While it is generally desirable to avoid passing light to a switch through the substrate, for purposes of providing a physically short switching path and faster response time, it may, in some situations, become an effective way to implement the control circuit. When the substrate 29 is used as a light guide, light absorbed by $S_1$ results in light energy being transmitted by the EOD 28. The EOD 28 then scatters a portion of the transmitted light (as schematically indicated by reference numeral 27), which travels through the substrate to the switch $S_2$. When desired, the switch $S_2$ can be optically isolated from the switch $S_1$ and the substrate 29.

FIG. 4 illustrates the timing of the dynamical processes within the laser during a Q-switching and cavity dumping sequence. Curve (a) illustrates the growth of the population inversion while the laser cavity Q is low. After the cavity Q is switched to a high value, the population inversion falls as the optical energy builds up. Curve (b) shows the growth of the optical energy within the laser cavity after the cavity Q is switched to a high value, and a sharp reduction in the optical energy when the cavity Q is reduced. Curve (c) shows the output pulse which commences when the cavity Q is switched to a low value. Curve (d) shows the cavity Q and illustrates the times at which the Q changes.

Figure 5:
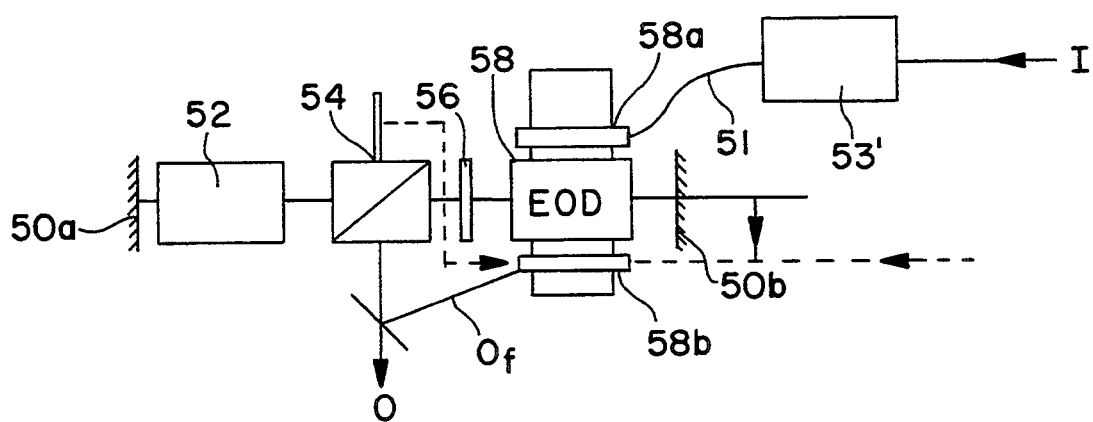
FIG. 5 is a schematic representation of a lasing system for Q-switching, mode-locking, cavity dumping and/or producing a controlled output signal.

Turning now to FIG. 5, an alternate method of activating the shorting switch 58b is depicted, wherein a signal, which comprises a fraction of the output signal, is used. As shown in solid by the line $O_f$, the shorting switch may be activated by light from the output signal $O_f$ alone. In this case, the act of shorting the switch 58b relies on some leakage light coming out along the output path O (indicated by the direction of the arrow) before the switch 58b is activated. Alternatively, as illustrated by dashed lines in FIG. 5, the switch 58b may be activated by a combination of light from the output signal O and leakage light, such as, for example, leakage light from the polarizer 54 or element 56. In this case, the leakage light provides the initial activation of switch 58b, which releases some output signal. In both cases, a fraction of the output signal is fed to the switch 58b, which increases the output signal, resulting in an increase of the activation of the switch 58b, which results in an increase in the output, and so forth. This positive feedback results in very fast switching of the EOD 58 and a fast risetime of the output pulse O. Alternatively, the shorting switch 58b can be controlled by light from a combination of sources; for instance, if there was no leakage from the polarizer 54 in the direction of the output, some external signal or signal from the output axis of the laser may be used (as illustrated by the dashed lines to the left of EOD 58 in FIG. 5) to initiate the cavity dumping process. This could be achieved by leakage obtained through the end mirror 50b, or from the side of the polarizer 54 opposite the output O. It should be noted that the length of the feedback path can be extremely short, and can be implemented using mirrors, a fiber feeding on to the shorting switch, or a combination of the two. The ability to closely couple the photoconductive switches and the EOD results in a minimal temporal delay in the control loop and extremely fast cavity dumping.

The time taken for the pulse to switch out of the cavity is determined by the fall-time of the voltage on the EOD 58 and the cavity round-trip transit time, whichever is longer. Computer modelling of a laser system using the configuration of FIG. 5 shows that a laser about 8 cm in length has the capability of producing mJ pulses with a duration of around 0.5 ns. The pulse length generated also depends on how much leakage radiation is used to illuminate the switch 58b. Higher levels of illumination will cause switch 59b to close earlier, resulting in shorter pulses. Use of smaller laser cavity lengths will reduce the pulse length to the picosecond regime.

The electro-optic modulator 58 may also be controlled to mode-lock the laser cavity. One method of mode-locking the laser cavity may be performed by applying a time-varying voltage to the EOD 58. This time-varying voltage may be applied with the sequential switching embodiment as generally shown in FIG. 2(c). If the voltage is made to vary at a frequency consistent with the frequency spectrum of the cavity (e.g., if the period of the voltage variation is similar to the round-trip transit time within the laser cavity), then the EOD 58 (FIG. 5) will mode-lock the optical energy within the laser cavity. Thus, all three functions, Q-switching, mode-locking and cavity dumping, can be achieved by control of a single intracavity element.

An example of an optical-to-optical modulator generally in accordance with that of FIG. 2(a) has been fabricated and tested in a laser system generally in accordance with that of FIG. 5 to demonstrate Q-switching- /feedback cavity dumping and Q-switching/feedback mode-locking/cavity dumping. The modulator was constructed by pressure mounting two lengths of 250 μm thick copper-coated kapton on either side of a Pockels cell (PC) to a copper plate: the PC had previously been soldered to the plate. The PC was an x-cut 7.45 mm×7.45 mm×21 mm LiNBO$_3$ crystal, with the electric field applied transversely. It should be understood that the size of the modulator could be in the range of a few 10's of μm to several mm in transverse dimension and approximately 1-50 mm in length. The charged line was, in this case 2 cm in length, and 3 cm wide, connected to a variable d.c. high voltage power supply through a 10 MΩ charging resistor. The shorting section contained a switch and a short to ground. The size of the charged line is commensurate with the size of the EOD and the speed of operation. The light activated switches were reverse-biased, high-voltage silicon junctions, approximately 1 mm in height, 1 mm in length (in the direction of the electric field) and 1 cm in width. The switch size was chosen to match the transmission line size, the required voltage and the laser wavelength. Switches can have a thickness ranging from a few μm to a few mm, a length of several μm to several mm, depending on the voltage holding requirements, and widths ranging from around 1 mm to several 10's of mm. Both switches were mounted in close proximity to the e/o crystal in order to minimize the switching times. A length of copper foil connected the upper electrode of the PC to each switch. The activation switch was operated using either a 100 W, 200 ns pulsed laser diode (Laser Diode Inc. L.D. 168F), or a 35 ps' pulse obtained from a second Nd:YAG laser. The voltage on the charged section was set so that the PC saw a quarter wave voltage (2.1 kV) when the laser Q-switched.

Figure 6A:
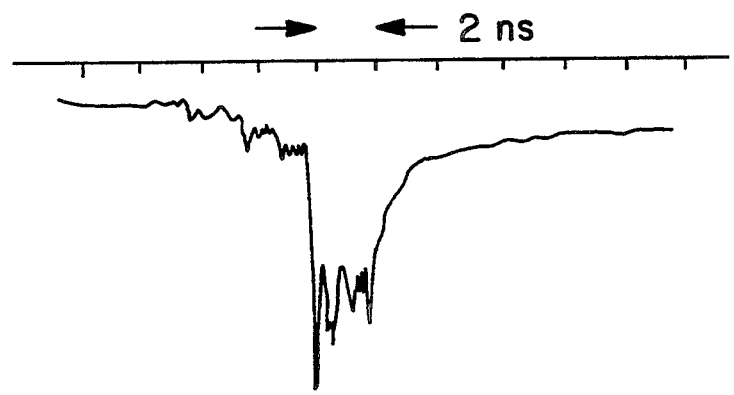
FIGS. 6(a)–(c) are traces of signals illustrating an example of operation of the system of FIG. 5.

The active laser medium was a flashlamp pumped, 115 mm long, 7 mm diameter Nd:YAG rod. A Glan-Taylor polarizer and quarter-wave plate were used to close the cavity. The laser was operated with cavity lengths between 45 and 95 cm. FIG. 6 illustrates the output from the laser when it was operated in the Q-switched/cavity dumped mode with a cavity length of 45 cm. Cavity dumping commenced when the optical field in the laser built up sufficiently that leakage from the output initiated the shorting switch. The output pulse is shown in FIG. 6(a). The pulse risetime is around 400 ps, and the FWHM pulse duration is 2.2 nsec. The pulse energy was 4.5 mJ. When the optical feedback to the modulator was blocked, the laser operated in a conventional Q-switched mode, with a pulse length of more than 20 ns.

Figure 6B:
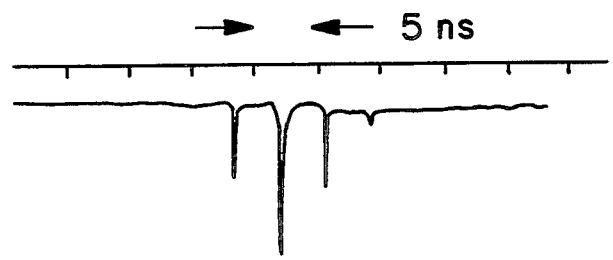
Figure 6C:
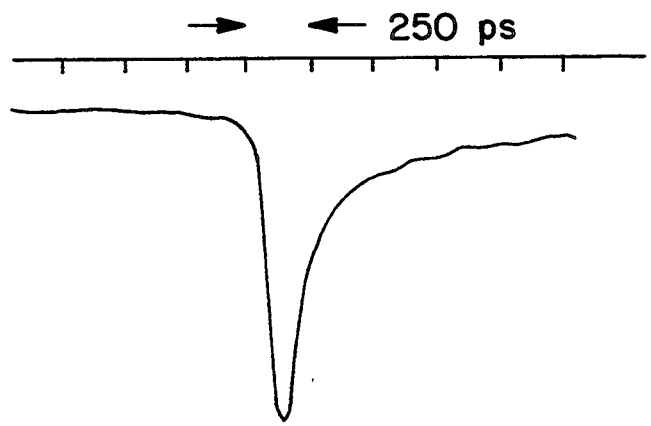
Figure 7A:
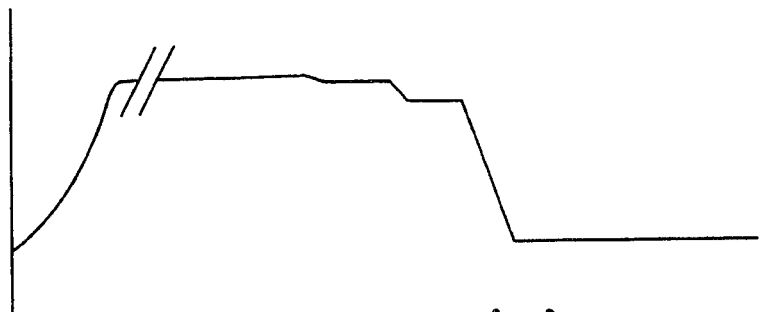
FIG. 7 illustrates the timing of the dynamic processes within a laser system during a Q-switching, mode-locking, cavity dumping sequence.
Figure 7B:
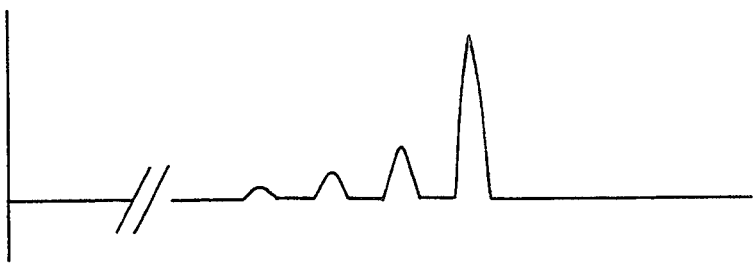
Figure 7C:
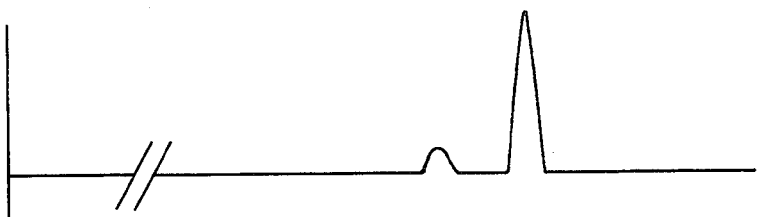
Figure 7D:

By reducing the voltage on the Pockels cell to 1.4 kV when the laser Q-switched, the same optical configuration generated mode-locked laser pulses. Since the Pockels cell did not operate at the quarter wave voltage, there was leakage off the polarizer during the build up of the pulse. The resultant cavity dump did not take place from as high a cavity Q as before, resulting in the generation of a Q-switched, cavity-dumped mode-locked pulse train, rather than a single pulse. The mode-locked pulse train is shown in FIG. 6(b). FIG. 6(c) shows a measurement of a single pulse having a width of 151 ps. Deconvolving the impulse response of the measurement instrumentation the mode-locked pulse length was estimated to be less than 77 ps. The total energy content of the pulse train was ~1.5 mJ.

Two advantages of mode-locking through application of a time-varying voltage to the electro-optic device are that the modulation of the intracavity radiation can be very deep, up to 100%, and that the length of the open "window" (i.e., the length of time that the modulation has 100% transmission through the cavity) can vary with time, starting as a wide window and gradually reducing width as the pulse builds up. The deep modulation of the intracavity radiation may be used to drive the bandwidth of the mode-locked pulse extremely wide. This technique may be used to initiate the mode-locking process, whereafter mode-locking may be sustained by feedback mode-locking.

In the embodiment of FIG. 5, when mode-locking using optical energy from within the laser cavity, in a manner similar to the Q-switching and cavity dumping described above, the light activated switch 58a is shorted by an optical input control signal. While the optical energy in the laser cavity is increasing, a short pulse is generated in the noise during the early stages of pulse build up. Some of this short pulse $O_f$ is then fed back to the light activated switch 58b. Since the energy in this short pulse $O_f$ is small, the resistance of the light activated switch 58b (which in this example is preferably a linear photoconductive switch) stays high, but lowers sufficiently to result in a small drop in the voltage applied to the EOD 58.

Assuming the switch 58b is controlled using a transmission line structure as in FIG. 2(a), and that the impedance of the transmission line is different from that of the EOD 58, then the voltage on the EOD 58 is disconnected from the transmission line for short intervals. As a result, the EOD 58 recovers, at least partially, by being recharged from the transmission line. The pattern of modulation and recovery repeats on every round trip of the short pulse, thus the cavity sees a modulation of the Q at the cavity round-trip frequency. This type of modulation is hereinafter referred to as "feedback mode-locking."

FIG. 7 illustrates the timing of the dynamical processes within the laser during the Q-switching, feedback mode-locking and cavity dumping sequence. Curve (a) illustrates the growth of the population inversion while the laser cavity Q is low. After the cavity Q is switched to a high value, the population inversion falls in a generally stepwise manner as the optical energy in the mode-locked pulse builds up. Curve (b) illustrates the growth of the optical pulse within the laser cavity after the cavity Q is switched to a high value, and a sharp reduction in the optical energy when the cavity Q is reduced. Curve (c) illustrates the mode-locked output pulse which is produced when the cavity Q is switched to a low value. Curve (d) illustrates the cavity Q and illustrates the times at which the Q changes. The small variation in Q and recovery is due to the feedback on the EOD 58 arising from the intracavity pulse.

As will be described in more detail below, using the same configuration of FIGS. 3a, 3b or 5, rather than relying on cavity dumping to determine the length of the output pulse, the laser may be mode-locked, or Q-switched and mode-locked, while relying on the self-cavity dumping effect described above to produce the output pulse.

FIG. 2(b) illustrates an optical modulator and control device in the form of a transmission line having conductive layers 21 and 22 deposited on a dielectric substrate. As alluded to above, the EOD 28 consists of an electro-optic material which may comprise all, or at least part of the dielectric 23. In any event, the EOD 28 comprises that portion of the dielectric 23 through which the optical energy to be modulated, i.e., the beam O, passes. The switch $S_1$ preferably comprises a light activated semiconductor switch which is preferably formed between segments of the conductive layer 21 and on the region of the transmission line 21 which includes the EOD 28. Activation of the EOD 28 by a photoconductive device, such as the switch $S_1$, can be accomplished in such a way that the output of the EOD 28 is essentially linear with respect to the input energy. In such a case, the EOD 28 takes on the aspect of a three-port device, wherein a device, such as switch $S_1$, having a low power optical input, is used to trigger and/or modulate a relatively high-power output, such as the output O of the EOD 28.

The optically controlled modulator may be configured in various ways, which affect the time dependence of the control signal applied to the modulator. If the EOD material forms part of the dielectric in a matched planar transmission line structure (as illustrated in FIG. 2(b)), then, as alluded to above, the switch (or switches) may simply separate the EOD from a charged section C of the charged transmission line 20.

Alternatively, as best seen in FIG. 2(c), a series of charged sections may be separated by a series of switches. In the embodiment of FIG. 2(c), a plurality of light activated switches $S_1$, $S_2$, and $S_3$ are used to synthesize an electromagnetic waveform to modulate the light energy passing through the EOD 28. The transmission line 21 is divided into a plurality of portions, $C_1$, $C_2$, and $C_3$, each portion separated from adjacent portions by at least one light activated switch, e.g., $S_2$ and $S_3$, respectively. Switch $S_1$ is positioned between the portion of the transmission line adjacent to the EOD 28. Each portion of the transmission line may be of arbitrary length and pre-charged to an arbitrary voltage. In the example of FIG. 2(c), if switch $S_1$ is activated first, discharging the first pre-charged voltage $V_1$ across the electro-optic device 28 and an electromagnetic waveform is caused to travel across the electro-optic device 28. Then, for example, switches $S_2$ and $S_3$ may be activated at desired times to respectively discharge pre-charged voltages $V_2$ and $V_3$ across the electro-optic device 28 and thereby modify the applied electromagnetic waveform.

Although only three light activated switches and three transmission line segments have been shown in FIG. 2(c), as will be appreciated by the artisan after reading this specification, any number of light activated switches may be used. Further, these light activated switches may be located on either side of the electro-optic device 28 and may connect a voltage source (or uncharged transmission line segment) to the electro-optic device 28 upon activation. Additionally, in the manner detailed in U.S. Pat. No. 5,109,203, each light activated switch may receive a separate, timed optical input control signal. Alternatively, two or more light activated switches may receive the same optical input control signal or a signal derived from the same optical input control signal. The voltage on each transmission segment may be of the same or opposite polarity.

As should be understood by the artisan, using such a structure and the simultaneous or sequential switching techniques of U.S. Pat. No. 5,109,203, virtually any wave shape can be generated and the electro-optic device controlled to modulate the beam O as desired.

In most applications, the switch carrier lifetime must exceed the duration of the electrical pulse or the switches will require continual illumination until the wave has passed. For fast switching, which is independent of the applied voltage, non-linear switches, such as avalanche or lock-on switches, are not recommended. Rather, linear switches, where each carrier pair is created from the absorption of one photon, is preferred.

The light activated switches may be comprised of any suitable material. For example, the material may be comprised of any of the elemental semiconducting materials, such as silicon (Si), diamond (C), or germanium (Ge); the group IV semiconducting compounds, such as silicon carbide (SiC), the group III-V semiconducting compounds and alloys, including, but not limited to, gallium arsenide (GaAs), aluminum gallium arsenide (AlGaAs), indium phosphide (InP), and indium arsenic phosphide (InAsP); and the II-VI semiconducting compounds and alloys, including, but not limited to, zinc selenide (ZnSe), zinc sulfide (ZnS), mercury cadmium telluride (HgCdTe) and lead tin selenide (PbSnTe).

The termination of the transmission line may be a matched load, an open circuit, a short circuit, or an unmatched load for respectively causing no reflection, 100% positive reflection, 100% negative reflection, or less than 100% reflection with either positive or negative reflection. If the electromagnetic wave is reflected, the length of the line determines the delay time and the magnitude of the mismatch determines the amplitude of the reflected waveform. The length of the delay line may be controlled by using a combination of series and parallel light activated switches which are closed prior to modulation.

The optical-to-optical modulator may thus be selectively controlled in accordance with the optical input control signals and with the variable voltages pre-charged on the portions of the transmission line. The sequential switching of the plurality of light activated switches allows the electromagnetic waveform to take virtually any shape thereby allowing the modulated optical energy to also take virtually any shape.

If the period of time in which the cavity Q is at the lower value of Q is small in comparison to the transit time of the optical energy within the laser cavity, the optical-to-optical modulator will produce a short pulse of optical energy. By varying the amount by which the Q of the cavity drops and the time during which the cavity Q remains at any value of Q, the output of the laser cavity may be selectively controlled to have virtually any shape.

Figure 8A:
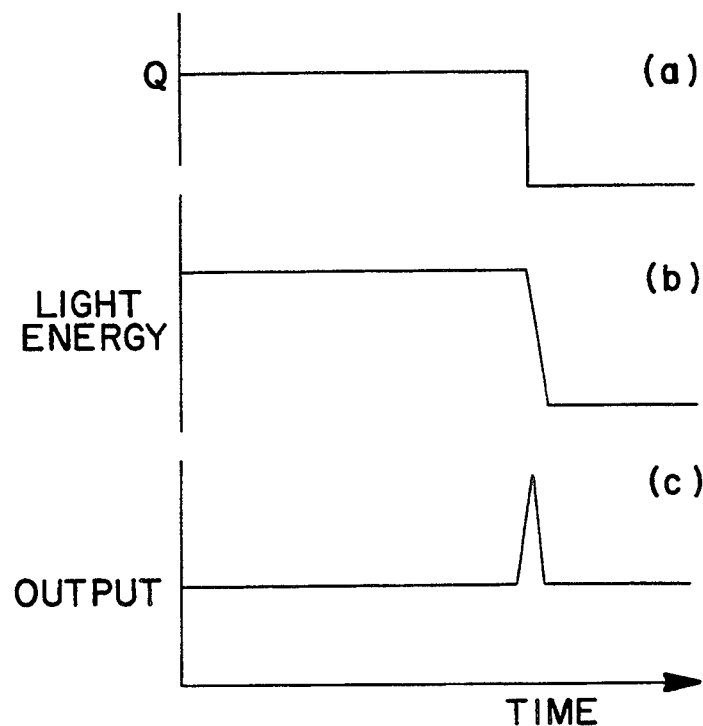
FIGS. 8a and 8b are timing charts comparing the dynamic process for cavity dumping with that of producing a controlled output.
Figure 8B:
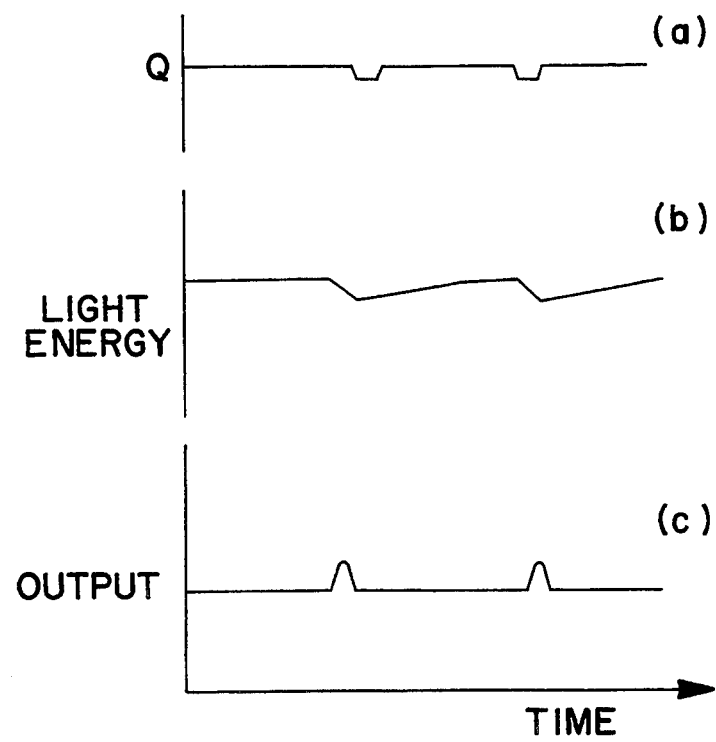

FIGS. 8(a) and 8(b) compare the dynamical process for cavity dumping with the process used for producing a controlled output. In the graphs of FIGS. 8(a) and 8(b), curve (a) shows the cavity Q, curve (b) shows the intracavity optical energy, and curve (c) shows the output. In the case of cavity dumping, the cavity Q is reduced to a low value in a time short in comparison to the cavity transit time and maintained at that value for a time long in comparison to the cavity transit time in order to allow all the optical energy to escape the cavity. In contrast, the controlled output is generated by reducing the cavity Q to a lower value for a time short in comparison with the cavity transit time, thus allowing the escape of a portion of the optical energy within the cavity. The optical energy remaining within the cavity may (as illustrated), or may not (not illustrated), regain its former level before the controlled output process is repeated.

Rather than using the electro-optic device, a separate intracavity element may be used to increase the cavity Q. Alternatively, the laser cavity may be such as to inherently have a high cavity Q thereby eliminating the need for an intracavity element to increase the cavity Q.

Regardless of the manner in which the cavity Q is set to a high value, the optical-to-optical modulator may then be used to cavity dump the optical energy by quickly dropping the cavity Q from a high value of Q to a low value of Q in a time fast in comparison to the transit time of the optical energy within the laser cavity. For the embodiments of FIGS. 3(a) and 3(b), the energy in the laser cavity may be dumped by activating the light activated switch 38b. By quickly lowering the cavity Q and maintaining it at a low value, the optical energy quickly exits the lasing cavity, thereby effectively cavity dumping.

Instead of cavity dumping, the optical-to-optical modulator may be used to produce a controlled output signal. Once the cavity Q is at a first high value, the light activated switch 38b may be activated to drop the cavity Q down to a second value of Q lower than the first value of Q. The cavity Q is not maintained at the lower value of Q, but is quickly raised back up to a higher value of Q. This higher value of Q may or may not be the same as the first value of Q.

Since the controlled output of the laser cavity may be selectively shaped, various types of modulation are possible with the present optical-to-optical modulator. For instance, the output of the laser cavity may be an amplitude modulated signal, a pulse-position modulated signal, a frequency modulated signal, or a pulse width modulated signal. In other words, as discussed above with reference to FIG. 2(b), the entire system can be considered as a three-port device, including a high-energy output port and a low-energy control port.

Either of the methods of mode-locking discussed above with reference to FIG. 5 may also be performed in conjunction with Q-switching and/or cavity dumping for producing a controlled output. For instance, with reference to FIG. 9, one or more light activated switches 95 apply a voltage V (arbitrarily selectable in accordance with the operation of the circuit, such as, for example, that of FIG. 2(c)) across the EOD 98. A light activated switch 91 and a light activated switch 93 are provided in parallel for shorting the voltage applied across EOD 98.

The light activated switch or switches 95 may be used for Q-switching the optical energy within the laser cavity.

The light activated switch 91 is used for feedback mode-locking the laser cavity. The light activated switch 91 may receive a fraction of the pulse output energy from the polarizer 94 as an optical input control signal. These pulses, as described above, mode-lock the laser cavity to the frequency of the pulses.

Instead of feedback mode-locking the laser cavity, the laser cavity may instead be mode-locked by applying a voltage having a frequency in tune with the cavity resonance. This voltage may be applied with the sequential switching embodiment generally shown in FIG. 2(c).

The light activated switch 93 is for cavity dumping, or producing a controlled output signal. The switch 93 receives at least a portion of the light representing its control signal from the polarizer 94. For cavity dumping, the switch 93 is preferably closed when the optical energy within the cavity is at a maximum. Alternatively, the light activated switch 93 may simply be responsive to an optical input control signal which comprises light from within the cavity, from another intracavity element, or from an external source for either cavity dumping or for producing a controlled output signal.

As alluded to above, the light activated switch 91 is used to mode-lock the laser cavity and should, therefore, preferably have a short carrier lifetime, i.e., a fast-recovery, light-activated switch. In comparison, the light activated switch 93 will advantageously have a longer carrier lifetime, and would be a light activated switch with a slower recovery.

Figure 9:
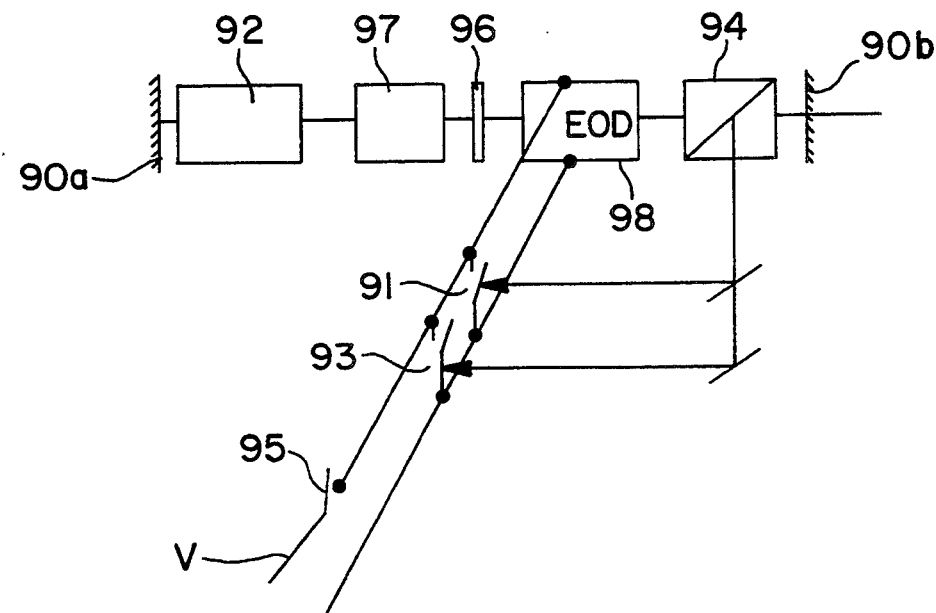
FIGS. 9 and 9a are, respectively, a schematic representation of a second embodiment of a lasing system having an optical-to-optical modulator having fast and slow switching for accomplishing mode-locking and an exemplary physical embodiment illustrating an EOD integrated into a switched transmission line.

It should be appreciated that one reason the device of FIG. 9 accomplishes mode-locking is because there are not enough carriers produced by the control signal to maintain the switch 91 closed. In other words, the resistivity of the switch 91 partially recovers between light pulses. In that regard, applicant has found it advantageous to include a dye cell 97 within the laser cavity. It has been found that a low concentration of dye enhances the quality of the output pulse, or pulse train, by reducing inter-pulse noise which arises due to incomplete recovery of the EOD 98 between pulses.

Figure 9A:
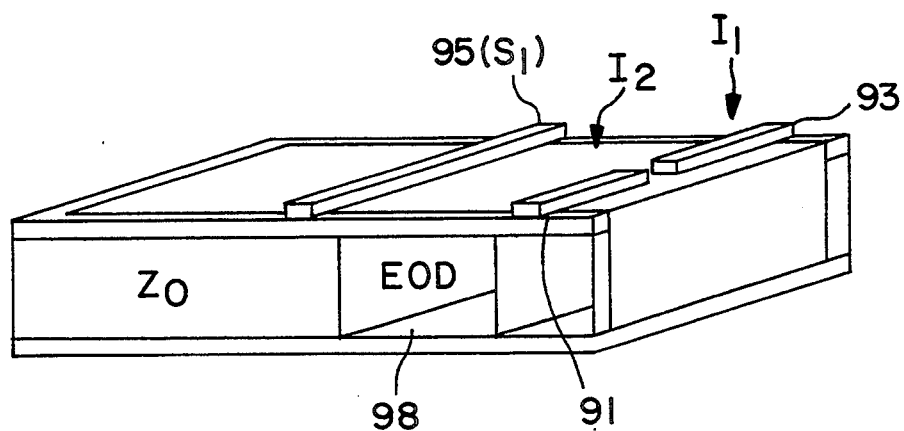

FIG. 9a shows an exemplary embodiment of an EOD integrated in a switched transmission line structure for feedback mode-locking, as illustrated in FIG. 9. Switch S1 may have dimensions in the range of a few $\mu$m to around 1 mm in height and length (as measured in the direction of the applied electric field) and from around one to many mm in width. The two shorting switches shown, 91 and 93, will typically have dimensions in the same regime as S1, except that the width of switches 91 and 93 will, in the case shown, advantageously be about one-half the width of S1. Both the thickness and height of the EOD can range from several $\mu$m to a few mm. The optical path length of the EOD is set mainly by the EOD material characteristics.

Figure 10:
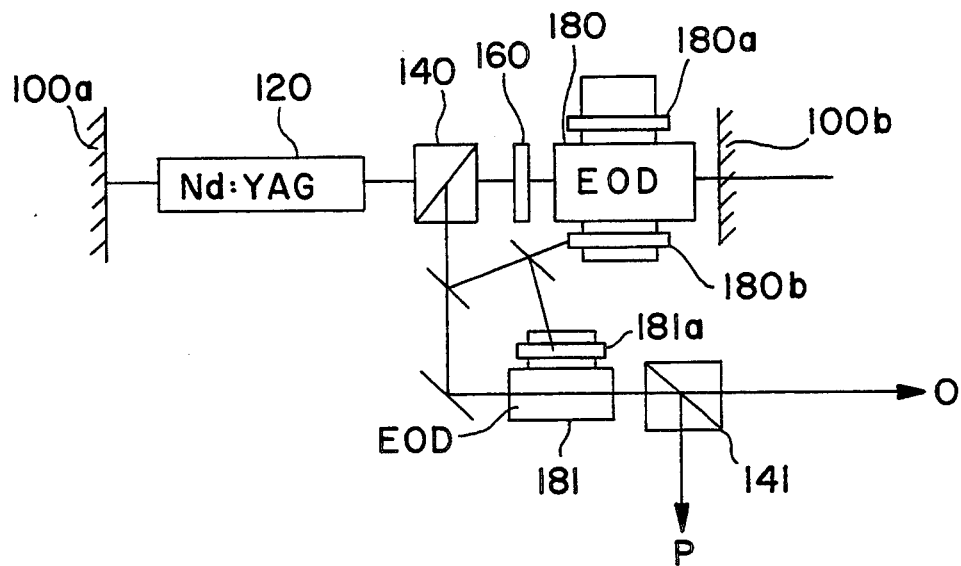
FIG. 10 is a schematic representation of a third embodiment of a lasing system having an electro-optic device for the feedback or feedforward control of an optical-to-optical modulator.

FIG. 10 depicts another embodiment of the invention. This embodiment utilizes feedback mode-locking with both Q-switching and cavity dumping. When mode-locking, it is desirable to increase the effectiveness of mode-locking by (the equivalent of switch $S_2$ in FIG. 2(a)) causing more light energy to impinge on the light activated switch 180b to cause a deeper modulation of the light in the cavity. On the other hand, it is desirable to reduce the total energy impinging on the light activated switch 180b in order to minimize the leakage of light before cavity dumping. As is apparent, these two requirements must be balanced against each other.

FIG. 10 illustrates a way of reducing the leakage of light. A second electro-optic device EOD2 (181), receives the output of polarizer 140 via a light activated switch 181a. In operation, before the output from the polarizer 140 reaches a certain threshold magnitude, the electro-optic device EOD2 (181) passes light output from the polarizer 140 unrotated. The output from the electro-optic device EOD2 (181) is then dumped from a second polarizer 141 as pre-pulses P. Once the magnitude of the output P from the polarizer 140 reaches the threshold value, the second electro-optic device EOD2 (181) rotates the output thereby causing light from the output of the polarizer 140 to pass through the second polarizer 141 as an output signal O. Thus, the output of polarizer 140 is used to switch its own pulse selector.

Figure 11:
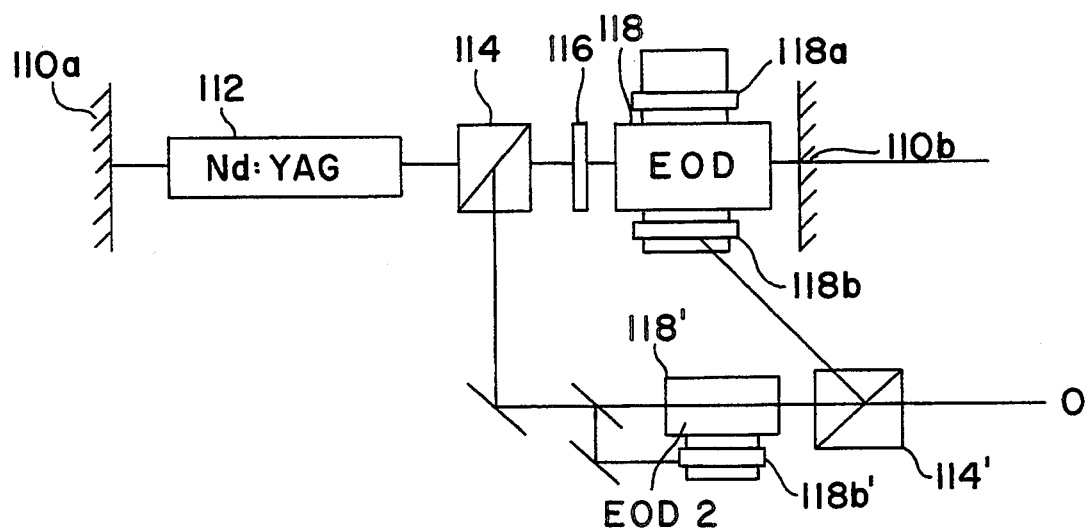
FIG. 11 is a schematic representation of a fourth embodiment of a lasing system having an electro-optic device for the feedback or feedforward control of an optical-to-optical modulator.

In the embodiment of FIG. 11, the percentage of output light illuminating the light activated switch 118b when the intracavity light level is low is increased and the percentage of the output light illuminating the light activated switch 118b when the intracavity intensity is high is reduced. In FIG. 11, a first control loop for a second electro-optic device EOD2 (118') includes a second control loop between polarizer 114 and the electro-optic EOD device (118).

As shown in FIG. 11, the second electro-optic device EOD2 (118') and a second polarizer 114' are positioned in the control loop between the polarizer 114 and the light activated switch 118b of EOD 118. The electro-optic device EOD2 (118') and the polarizer 114' allow light to pass through and onto the light activated switch 118b with a small fraction of the light being diverted to a light activated switch 118b' used for turning the electro-optic device EOD2 (118') on. When the level of light escaping from the cavity via the polarizer 114 through the control loop is low, a high percentage of the light energy being fed to the light activated switch 118b will pass through the electro-optic device EOD2 (118'), unrotated and onto the light activated switch 118b. However, if the amount of light passing through the electro-optic device EOD2 (118') increases, EOD2 is gradually turned on and the percentage of light energy reaching the light activated switch 118b is reduced. The electro-optic device EOD2 (118') should not reduce the light energy to electro-optic device EOD (118) to the extent where cavity dumping is prevented.

Figure 12A:
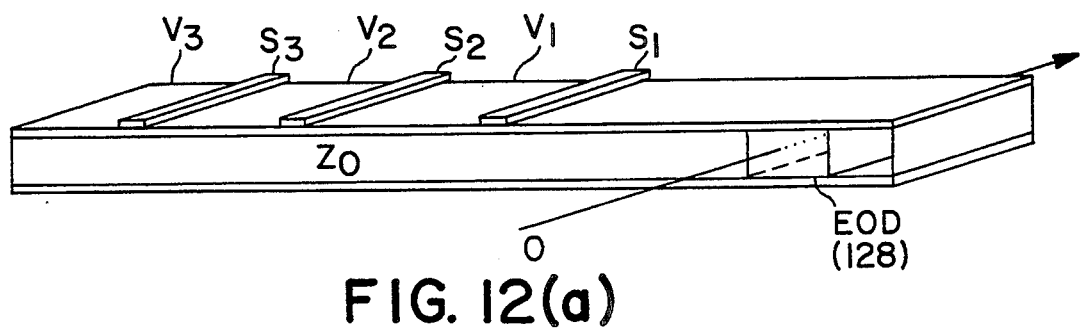
FIGS. 12(a), (b) (c) and (d) are schematic representations of embodiments of an optical-to-optical modulator for modulating multiple optical beams.
Figure 12B:
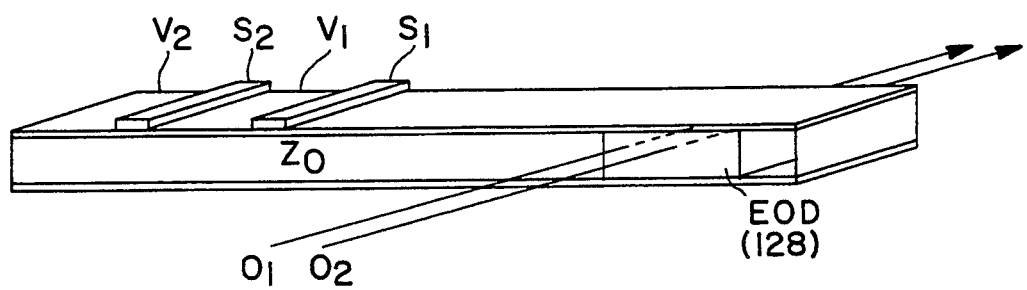

A further use of an electro-optic device with a light activated switch is to employ a single electro-optic device as a control element for a plurality of beams from parallel lasers. As shown in FIG. 12(a), instead of using a single electro-optic device EOD to modulate just one optical beam O, a single electro-optic device EOD 128 may be used to modulate a plurality of optical beams. For example, as shown in FIG. 12(b), a single electro-optic device 128 modulates optical beams $O_1$ and $O_2$ in accordance with a common electromagnetic waveform, determined by the closing of switches $S_1$ and $S_2$ and by the voltages $V_1$ and $V_2$ and the characteristics of the transmission line. As should now be apparent, the placement and number of light activated switches may be arbitrary, as is the voltage on the transmission segments. Thus, a plurality of lasers acting in parallel could be made to operate in perfect synchronism, and the light energy from those lasers modulated as desired.

Additionally, by mounting the electro-optic device in a matched configuration on a transmission line structure, several control signals may be simultaneously impressed on the electro-optic device, thus permitting extremely high frequency modulation of the laser.

Figure 12C:
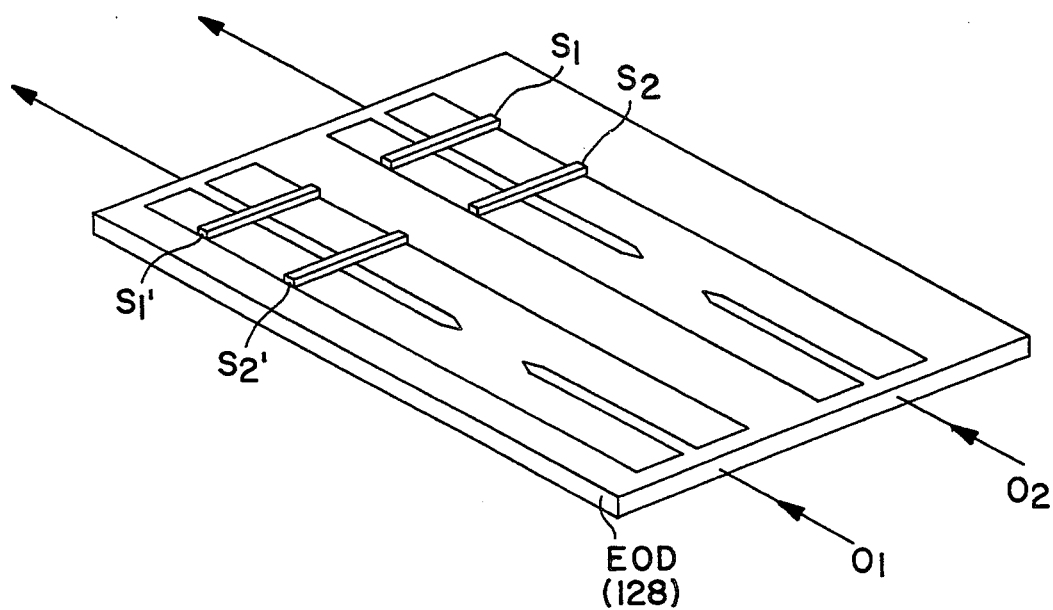
Figure 12D:
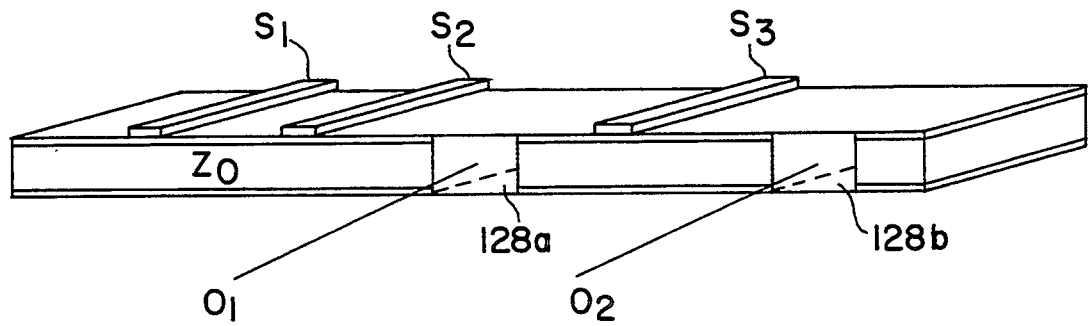

As shown in FIG. 12(c), a single electro-optic device 128 may also be used to modulate a plurality of beams $O_1$ and $O_2$ in accordance with a plurality of electromagnetic waveforms, each of which travels along a separate path on the electro-optic material. FIG. 12(d) illustrates another embodiment of the invention in which separate sections of EOD, 128 and 128a, in a single transmission line structure may be used to modulate a plurality of beams $O_1$ and $O_2$, on an independent basis, by separating the sections of EOD with a switch, $S_3$. Thus, by appropriate positioning and timing of the activation of the light activated switches and the voltages, controlled by the light activated switches, each optical beam may be separately modulated or otherwise controlled even though only a single electro-optic device 128 is being used.

Figure 13A:
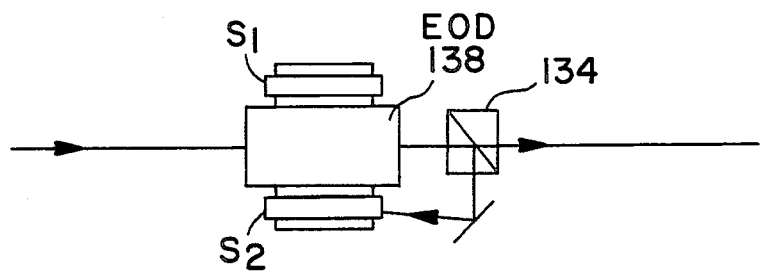
FIGS. 13a and 13b are schematic depictions of an optical modulator controlled by a light activated switch illustrating feedback and feedforward control techniques.
Figure 13B:
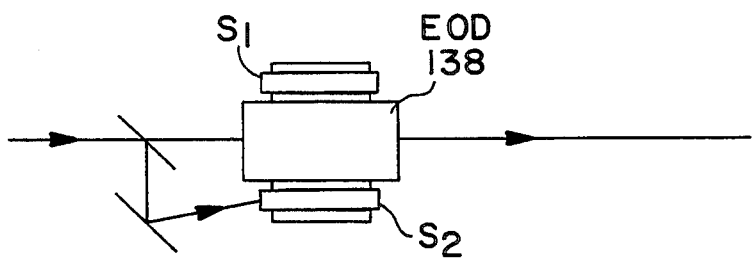

A further use of an electro-optic device controlled by a light activated switch, as illustrated in FIG. 13, is to employ feedback or feedforward to control the electro-optic device in accordance with the level of light passing through the device. As is shown in FIG. 13(a), a fraction of the output of the EOD 138 is directed to a switch $S_2$, thus controlling the voltage level applied to the EOD 138 according to what has been transmitted. Alternatively, as is shown in FIG. 13(b), a fraction of the input to the EOD 138 is directed to a switch $S_2$, thus controlling the voltage applied to EOD 138 according to what is going to be transmitted by the EOD. Thus, by judicious choice of switch placement, voltage level and optical configuration, the optical beam may be controlled in a manner according to the information content of the optical beam itself.

The foregoing description of the preferred embodiments of the invention has been presented for purposes of illustration and description. It is not intended to be exhaustive or to limit the invention to the precise forms disclosed. Many modifications and variations are possible in light of the above teaching.

For instance, the laser cavity may be implemented with bulk components or as an optically integrated structure. Additionally, the laser could be either simply Q-switched prior to cavity dumping, could be mode-locked prior to cavity dumping, or could be both Q-switched and mode-locked prior to cavity dumping. The size of the EOD can range, for example, from a few 10 μm to several mm in the transverse dimension and approximately 1–50 mm in length.

The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An optical-to-optical modulator having an optical input control signal for controlling the modulation of an optical output, comprising:
   a source of optical energy;
   means for modulating said optical energy to generate a modulated optical output;
   means for generating and transmitting to said modulating means an electromagnetic waveform, said generating and transmitting means comprising a transmission line having a dielectric and a conductive layer on said dielectric and at least one light activated switch, said at least one switch being controlled by an optical input control signal for selectively varying the electromagnetic waveform to thereby modulate said optical output; and
   wherein said modulating means comprises an electro-optic material, at least partially formed from a portion of said dielectric, and wherein said at least one switch is formed between adjacent segments of said conductive layer and positioned where said electro-optic material forms said dielectric.

2. The optical-to optical modulator according to claim 1, wherein said generating and transmitting means includes at least two switches and wherein said switches, said dielectric and said modulating means form a distributed transmission line.

3. The optical-to-optical modulator according to claim 2, wherein said input control signal comprises at least two optical input control signals, each of said control signals being optically connected to one of said light activated switches.

4. The optical-to-optical modulator according to claim 3, further comprising a plurality of voltage sources, each connected in said transmission line and controlled by a different one of said light activated switches, whereby said electromagnetic waveform is selectively synthesized by application of said voltage sources and by application of said optical input control signals to said at least two switches to thereby arbitrarily control the modulation of said output.

5. The optical-to-optical modulator according to claim 2, wherein said input control signal comprises a plurality of input control signals and wherein said light activated switches are positioned along said distributed transmission line, each of said light activated switches receiving a respective one of said optical input control signals.

6. The optical-to-optical modulator according to claim 5, further comprising a plurality of voltage sources, each connected to said transmission line and controlled by a different one of said light activated switches, whereby said electromagnetic waveform is selectively synthesized by application of said voltage sources and by application of said optical input control signals to said at least two switches to thereby arbitrarily control the modulation of said output.

7. The optical-to-optical modulator according to claim 2, wherein said switches and modulating means are at least partially embedded in a substrate of said distributed transmission line, and wherein said substrate comprises the light path for transmitting light to at least one of said switches.

8. The optical-to-optical modulator according to claim 1, wherein said at least one light activated switch is selected from the group comprising bulk or junction devices.

9. The optical-to-optical modulator according to claim 1, wherein said at least one light activated switch has a linear photoconductive characteristic.

10. The optical-to-optical modulator according to claim 1, wherein said at least one light activated switch has a non-linear photoconductive characteristic.

11. The optical-to-optical modulator according to claim 10, wherein said at least one light activated switch is selected from the group comprising avalanche or lock-on devices.

12. The optical-to-optical modulator according to claim 1, wherein said modulating means modulates the amplitude of said optical energy.

13. The optical-to-optical modulator according to claim 1, wherein said modulating means modulates the phase of said optical energy.

14. The optical-to-optical modulator according to claim 1, wherein said modulating means modulates the polarization of said optical energy.

15. The optical-to-optical modulator according to claim 1, wherein said modulating means comprises a Pockels cell.

16. The optical-to-optical modulator according to claim 1, wherein said modulating means comprises a Faraday rotator.

17. The optical-to-optical modulator according to claim 1, wherein said modulating means comprises a Kerr cell.

18. The optical-to-optical modulator according to claim 1, wherein said modulating means is positioned within a Fabry-Perot resonator.

19. The optical-to-optical modulator according to claim 1, further comprising at least one variable voltage source connected to said generating and transmitting means for selectively controlling said electromagnetic waveform.

20. The optical-to-optical modulator according to claim 1, wherein said generating and transmitting means including said at least one light activated switch and said modulating means form an integrated circuit.

21. The optical-to-optical modulator according to claim 1, wherein said modulator is formed in sections, each of said sections being operable to independently modulate light.

22. The optical-to-optical modulator according to claim 21, further comprising a switch means positioned between said sections for connecting one of said sections to said generating and transmitting means.

23. The optical-to-optical modulator according to claim 1, further comprising a feedback loop wherein said input control signal comprises a feedback signal derived from light which has passed through said modulator.

24. The optical-to-optical modulator according to claim 23, further comprising a second means for modulating optical energy positioned in said feedback control loop for modulating the optical energy therein.

25. The optical-to-optical modulator according to claim 1, further comprising a feedforward loop wherein said input control comprises a feedforward signal derived from light which is to be passed through said modulator.

26. The optical-to-optical modulator according to claim 25, further comprising a second means for modulating optical energy positioned in said feedforward control loop for modulating the optical energy therein.

27. An optical-to-optical modulator having at least one optical input control signal for controlling the modulation of an optical output, comprising:
a source of optical energy;
means for modulating optical energy to generate a modulated optical output;
means for generating and transmitting to said modulating means an electromagnetic waveform, said generating and transmitting means comprising a transmission line having a dielectric and a conductive layer on said dielectric and at least two light activated switches, said at least two switches being controlled by an optical input control signal for selectively varying said electromagnetic waveform; and
wherein said modulating means comprises an electro-optic material and wherein at least a portion of said dielectric and said at least two switches are formed between segments of said conductive layer.

28. The optical-to optical modulator according to claim 27, wherein said switches, said dielectric and said modulating means form a distributed transmission line.

29. The optical-to-optical modulator according to claim 27, wherein said light activated switches are selected from the group comprising bulk or junction devices.

30. The optical-to-optical modulator according to claim 27, wherein said at least one of said light activated switch has a linear photoconductive characteristic.

31. The optical-to-optical modulator according to claim 27, wherein said at least one of said light activated switches has a non-linear photoconductive characteristic.

32. The optical-to-optical modulator according to claim 31, wherein said at least one light activated switch is selected from the group comprising avalanche or lock-on devices.

33. The optical-to-optical modulator according to claim 27, wherein said modulating means modulates the amplitude of said optical energy.

34. The optical-to-optical modulator according to claim 27, wherein said modulating means modulates the phase of said optical energy.

35. The optical-to-optical modulator according to claim 27, wherein said modulating means modulates the polarization of said optical energy.

36. The optical-to-optical modulator according to claim 27, wherein said modulating means comprises a Pockels cell.

37. The optical-to-optical modulator according to claim 27, wherein said modulating means comprises a Faraday rotator.

38. The optical-to-optical modulator according to claim 27, wherein said modulating means comprises a Kerr cell.

39. The optical-to-optical modulator according to claim 27, wherein said modulating means is positioned within a Fabry-Perot resonator.

40. The optical-to-optical modulator according to claim 27, wherein said optical input control signal comprises at least two optical input control signals, each of said optical control signals being optically connected to one of said light activated switches.

41. The optical-to-optical modulator according to claim 40, further comprising a plurality of voltage sources, each connected in said transmission line and controlled by one of said light activated switches, whereby said electromagnetic waveform is selectively synthesized by application of said voltage sources and by application of said optical input control signals to said at least two switches to thereby arbitrarily control the modulation of said output.

42. The optical-to-optical modulator according to claim 27, wherein said input control signal comprises a plurality of input control signals and wherein said light activated switches are positioned along said distributed transmission line, each of said light activated switches receiving a respective one of said optical input control signals.

43. The optical-to-optical modulator according to claim 42, further comprising a plurality of voltage sources, each connected to said transmission line and controlled by a different one of said light activated switches, whereby said electromagnetic waveform is selectively synthesized by application of said voltage sources and by application of said optical input control signals to said at least two switches to thereby arbitrarily control the modulation of said output.

44. The optical-to-optical modulator according to claim 27, further comprising at least one variable voltage source connected to said generating and transmitting means for selectively controlling said electromagnetic waveform.

45. The optical-to-optical modulator according to claim 27, wherein said generating and transmitting means including said light activated switches and said modulating means form an integrated circuit.

46. The optical-to-optical modulator according to claim 27, wherein said switches and modulating means are at least partially embedded in a substrate of said distributed transmission line, and wherein said substrate comprises the light path for transmitting light to at least one of said switches.

47. The optical-to-optical modulator according to claim 27, wherein said modulator is formed in sections, each of said sections being operable to independently modulate light.

48. The optical-to-optical modulator according to claim 47, further comprising a switch means positioned between said sections for connecting one of said sections to said generating and transmitting means.

49. The optical-to-optical modulator according to claim 27, further comprising a feedback loop wherein said input control signal comprises a feedback signal derived from light which has passed through said modulator.

50. The optical-to-optical modulator according to claim 49, further comprising a second means for modulating optical energy positioned in said feedback control loop for modulating the optical energy therein.

51. The optical-to-optical modulator of claim 49, wherein said modulating means is part of a laser system and said feedback signal is for mode locking said laser system, wherein said feedback loop includes a first light activated semiconductor switch and said feedback signal is optically coupled to said first light activated switch to mode lock said laser to mode lock said laser system to said feedback signal.

52. The optical-to-optical modulator according to claim 51, further comprising a second light activated semiconductor switch, connected in parallel with said first light activated semiconductor switch, said second light activated semiconductor switch having a longer carrier lifetime than said first light activated semiconductor switch for cavity dumping said laser system and for producing a controlled output therefrom.

53. The optical-to-optical modulator according to claim 27, further comprising a feedforward loop wherein said input control comprises a feedforward signal derived from light which is to be passed through said modulator.

54. The optical-to-optical modulator according to claim 53, further comprising a second means for modulating optical energy positioned in said feedforward control loop for modulating the optical energy therein.

55. An optical-to-optical modulator disposed within a lasing system having a lasing axis and positioned along said lasing axis, said optical-to-optical modulator comprising:
a source of optical energy;
means for modulating optical energy within said lasing system to generate a modulated optical output;
means for generating and transmitting to said modulating means an electromagnetic waveform, said generating and transmitting means comprising at least one light activated switch optically connected to an optical input control signal for selectively varying said electromagnetic waveform to thereby selectively control said modulated optical output; and
wherein said modulating means and said generating and transmitting means, including said at least one light activated switch, form a distributed, integrated transmission line having a dielectric, and wherein said modulating means forms at least a portion of said dielectric.

56. The optical-to-optical modulator according to claim 55, wherein said lasing system further includes an optical cavity defined by a pair of end mirrors, and wherein said optical input control signal comprises light from said optical cavity.

57. The optical-to-optical modulator according to claim 55, further comprising a polarizer disposed along said lasing axis and wherein said optical input control signal comprises light from said polarizer.

58. The optical-to-optical modulator according to claim 55, wherein said lasing system includes an optical cavity defined by a pair of end mirrors, and wherein said optical input control signal comprises light from a source external to said optical cavity.

59. The optical-to-optical modulator according to claim 55, wherein said lasing system further comprises an optical cavity defined by a pair of end mirrors and wherein said optical input control signal comprises light from an output of said lasing system external to said optical cavity.

60. The optical-to-optical modulator according to claim 55, wherein said optical input control signal comprises light from a plurality of sources.

61. The optical-to optical modulator according to claim 60, wherein said sources comprise at least one light source within said lasing system and at least one light source external to said lasing system.

62. The optical-to-optical modulator according to claim 55, wherein said light activated switch is selected from the group comprising bulk or junction devices.

63. The optical-to-optical modulator according to claim 55, wherein said light activated switch has a linear photoconductive characteristic.

64. The optical-to-optical modulator according to claim 55, wherein said light activated switch has a non-linear photoconductive characteristic.

65. The optical-to-optical modulator according to claim 64, wherein said light activated switch is selected from the group comprising avalanche or lock-on devices.

66. The optical-to-optical modulator according to claim 55, wherein said modulating means modulates the amplitude of the optical energy within said lasing system.

67. The optical-to-optical modulator according to claim 55, wherein said modulating means modulates the phase of the optical energy within said lasing system.

68. The optical-to-optical modulator according to claim 55, wherein said modulating means modulates the polarization of the optical energy within said lasing system.

69. The optical-to-optical modulator according to claim 55, wherein said modulating means comprises a Pockels cell.

70. The optical-to-optical modulator according to claim 55, wherein said modulating means comprises a Faraday rotator.

71. The optical-to-optical modulator according to claim 55, wherein said modulating means comprises a Kerr cell.

72. The optical-to-optical modulator according to claim 55, wherein said modulating means is positioned within a Fabry-Perot resonator.

73. The optical-to-optical modulator according to claim 55, wherein said at least one light activated switch comprises a plurality of light activated switches, and said optical input control signal comprises a plurality of control signals, each of said light activated switches receiving a respective one of said control signals.

74. The optical-to-optical modulator according to claim 73, further comprising a plurality of voltage sources, each of said voltage sources being connected in said transmission line and controlled by one of said light activated switches, whereby said electromagnetic waveform may be synthesized by application of said voltage sources and by application of said optical input control signals to said light activated switches to thereby arbitrarily control the modulation of said output.

75. The optical-to-optical modulator according to claim 55, wherein said at least one light activated switch comprises a plurality of light activated switches, said switches being at least partially embedded in a substrate of said distributed transmission line, and where said substrate comprises the path for the light for activating at least one of said switches.

76. The optical-to-optical modulator according to claim 55, wherein said optical input control signal comprises a plurality of optical input control signals and wherein said at least one light activated switch is positioned along said distributed transmission line, said at least one light activated switch being operable for receiving a selected one of said optical input control signals.

77. The optical-to-optical modulator according to claim 76, wherein said generating and transmitting means including said light activated switches and said modulating means form an integrated circuit.

78. The optical-to-optical modulator according to claim 55, further comprising a plurality of voltage sources, each of said voltage sources being connected to said transmission line and controlled by one of said light activated switches, whereby said electromagnetic waveform may be synthesized by application of said voltage sources and by application of said optical input control signal to said light activated switches to thereby arbitrarily control the modulation of said output.

79. The optical-to-optical modulator according to claim 55, further comprising at least one variable voltage source connected to said generating and transmitting means to selectively control said electromagnetic waveform.

80. The optical-to-optical modulator according to claim 55, wherein said means for generating and transmitting is operable to modulate said electromagnetic waveform so that a resonance of said lasing system is increased to a first value of Q.

81. The optical-to-optical modulator according to claim 80, wherein said means for generating and transmitting is further operable for modulating said electromagnetic waveform by modulating said value of Q a predetermined time after said Q is increased to said first value, whereby said resonance is decreased to a second value of Q and then increased to a third value of Q in a time short compared to the transit time of the optical energy in the lasing system.

82. The optical-to-optical modulator according to claim 81, wherein said means for generating and transmitting is operable for further modulating said value of Q in a time interval less than the transit time of the optical energy in the lasing system to produce a controlled output pulse from said modulator.

83. The optical-to-optical modulator according to claim 80, wherein said means for generating and transmitting further comprises means for modulating said electromagnetic waveform, wherein a predetermined time after said Q is increased to said first value, wherein said resonance is decreased to a second value of Q in a time short compared to the transit time of the optical energy in the lasing system.

84. The optical-to-optical modulator according to claim 80, further comprising means for feeding pulses of light back from an output of said lasing system to said light activated switch for causing said lasing system to mode-lock to the frequency of said pulses.

85. The optical-to-optical modulator according to claim 84, wherein controlling means further comprise means for modulating said electromagnetic waveform whereby at a time after said lasing system mode-locks, said resonance is decreased to a second value of Q and then increased to a third value of Q in a time short compared to the transit time of the optical energy in the lasing system.

86. The optical-to-optical modulator according to claim 84, wherein said means for generating and transmitting further include means for modulating said electromagnetic waveform whereby at a time after said lasing system mode-locks, said resonance is decreased to a second value of Q in a time short compared to the transit time of the optical energy in the lasing system.

87. The optical-to-optical modulator according to claim 84, wherein said light activated semiconductor switch is a short carrier lifetime switch, and further comprising a second light activated semiconductor switch having a carrier lifetime longer than the carrier lifetimes of said first-mentioned-light activated semiconductor switch.

88. The optical-to-optical modulator according to claim 87, wherein said second light activated semiconductor switch is responsive to a signal selected from the group consisting of at least a portion of said feedback signal; optical energy from within the modulator; and an external source of optical energy.

89. The optical-to-optical modulator according to claim 55, wherein said means for generating and transmitting modulates said electromagnetic waveform to cause said lasing system to mode-lock to the frequency of the modulated electromagnetic waveform.

90. The optical-to-optical modulator according to claim 89, wherein said means for generating and transmitting further includes means for modulating said electromagnetic waveform whereby at a time after said lasing system mode-locks, said resonance is decreased to a second value of Q and then increased to a third value of Q in a time short compared to the transit time of the optical energy in the lasing system 91. The optical-to-optical modulator according to claim 90, wherein said means for generating and transmitting is operable for further modulating said value of Q in a time interval less than the transit time of the optical energy in the lasing system to produce a controlled output pulse from said modulator.

92. The optical-to-optical modulator according to claim 89, wherein said means for generating and transmitting further include means for modulating said electromagnetic waveform whereby at a time after said lasing system mode-locks, said resonance is decreased to a second value of Q in a time short compared to the transit time of the optical energy in the lasing system.

93. The optical-to-optical modulator according to claim 55, further comprising means for feeding pulses of light from an output of said lasing system to said at least one light activated switch for causing said lasing system to mode-lock to the frequency of said pulses.

94. The optical-to-optical modulator according to claim 93, wherein said means for feeding pulses further comprises a control loop including a second means for modulating optical energy.

95. The optical-to-optical modulator according to claim 93, wherein said light activated semiconductor switch is a short carrier lifetime switch, and further comprising a second light activated semiconductor switch having a carrier lifetime longer than the carrier lifetime of said first-mentioned light activated semiconductor switch.

96. The optical-to-optical modulator according to claim 95, wherein said second light activated semiconductor switch is responsive to a signal selected from the group consisting of: at least a portion of said feedback signal; optical energy from within the modulator; and an external source of optical energy.

97. The optical-to-optical modulator according to claim 55, wherein said means for generating and transmitting further comprises means for modulating said electromagnetic waveform to cause said lasing system to mode-lock to the frequency of the modulated electromagnetic waveform.

98. The optical-to-optical modulator according to claim 97, wherein said means for generating and transmitting further comprises means for modulating said electromagnetic waveform to decrease a resonance of the lasing system from a first value of Q to a second value of Q and then to increase said resonance to a third value of Q in a time short compared to the transit time of the optical energy within the lasing system whereby the lasing system produces a controlled output signal.

99. The optical-to-optical modulator according to claim 97, wherein said means for generating and transmitting further comprises means for modulating said electromagnetic waveform to decrease a resonance of the lasing system from a first value of Q to a second value of Q in a time short compared to the transit time of the optical energy within the lasing system whereby the optical energy within the lasing system is cavity dumped.

100. The optical-to-optical modulator according to claim 55, wherein said means for generating and transmitting further comprises means for modulating said electromagnetic waveform to decrease a resonance of the lasing system from a first value of Q to a second value of Q and then to increase said resonance to a third value of Q in a time short compared to the transit time of the optical energy within the lasing system whereby the lasing system produces a controlled output signal.

101. The optical-to-optical modulator according to claim 55, wherein said means for generating and transmitting further comprises means for modulating said electromagnetic waveform to decrease a resonance of the lasing system from a first value of Q to a second value of Q in a time short compared to the transit time of the optical energy within the lasing system whereby the optical energy within the lasing system is cavity dumped.

102. The optical-to-optical modulator according to claim 55 laser system includes an optical cavity, and wherein said at least one light activated switch comprises a plurality of light activated switches whereby at least one of said switches receives light from a source external to said lasing system and at least one of said switches receives light from a source within said optical cavity.

103. The optical-to-optical modulator according to claim 102, further comprising a second means for modulating optical energy positioned to modulate the light to at least one of said plurality of light activated switches.

104. The optical-to-optical modulator according to claim 55, wherein said at least one light activated switch comprises a plurality of light activated switches wherein at least one of said switches receives light from a source external to said lasing system and at least one of said switches receives light from an output of said lasing system.

105. The optical-to-optical modulator according to claim 55, wherein said at least one light activated switch comprises a plurality of light activated switches wherein at least one of said switches receives light from a source external to said lasing system and at least a second of said switches receives the light from said external source after a predetermined time delay.

106. The optical-to-optical modulator according to claim 55, wherein said modulating means includes means for modulating a plurality of beams of optical energy.

107. The optical-to-optical modulator according to claim 106, wherein said dielectric is an electro-optic material and said transmission line further comprises a plurality of regions for modulating said plurality of beams of optical energy.

108. The optical-to-optical modulator according to claim 106, wherein said modulating means is operable to individually modulate each of said plurality of beams in accordance with a respective one of a plurality of electromagnetic waveforms.

109. The optical-to-optical modulator according to claim 106, wherein said modulating means modulates said plurality of beams in accordance with said electromagnetic waveform.

110. The optical-to-optical modulator of claim 55, wherein said modulating means is formed in sections, each of said sections being operable to independently modulate a beam of light.

111. The optical-to-optical modulator of claim 110, further comprising a switch means positioned between said sections for selectively connecting one of said sections to said transmission line.

112. A laser system, comprising:
a laser medium disposed within a lasing cavity having a lasing axis along which optical energy is emitted;
means, disposed along said lasing axis, and responsive to an applied electromagnetic field for modulating a characteristic of said optical energy;
means for inputting an electromagnetic waveform to said modulating means to generate said applied field, said inputting means comprising at least two light activated switches, each responsive to an optical input control signal for varying said applied electromagnetic waveform and thereby varying said applied electromagnetic field on a time scale short relative to the transit time of the optical energy within the lasing cavity;
wherein the optical energy output from said laser cavity is modulated in accordance with the applied electromagnetic waveform and the optical input control signal.

113. The system according to claim 112, wherein said inputting means comprises a transmission line having a pair of conductors separated by a dielectric, and wherein said light activated switches are formed in one of said conductive layers to control electromagnetic energy in said transmission line to thereby generate said electromagnetic waveform.

114. The system according to claim 113, wherein said transmission line further includes a substrate and said light activated switches and said modulating means are at least partially embedded in said substrate, and wherein said substrate comprises the path for the light for activating at least one of said switches.

115. The system according to claim 113, wherein said first and second switches each comprise at least one linear photoconductive switch.

116. The system according to claim 113, wherein said lasing system further comprises a polarizer disposed along said lasing axis and a second optical input control signal is derived from light exiting said polarizer.

117. The system according to claim 116, wherein said second optical input control signal comprises said first optical input control signal delayed by a predetermined time period.

118. The system according to claim 113, wherein said light activated switches comprise at least one non-linear photoconductive switch.

119. The optical-to-optical modulator of claim 113, wherein said modulator is formed in sections, each of said sections being operable to independently modulate a beam of light.

120. The optical-to-optical modulator of claim 119, further comprising a switch means positioned between said sections for selectively connecting one of said sections to said transmission line.

121. The system according to claim 112, wherein said inputting means comprises a first light activated switch controlled by a first optical input control signal, and a second light activated switch controlled by a second optical input control signal, wherein said first and second light activated switches, when closed by said first and second optical input control signals, pass said electromagnetic waveform to said modulating means.

122. The system according to claim 121, wherein the second optical input control signal is derived from optical energy within said lasing cavity.

123. The system according to claim 121, wherein the second optical input control signal is derived from an output of said lasing cavity.

124. The system according to claim 112, wherein said modulating means comprises an electro-optic device and said applied field comprises an electric field.

125. The system according to claim 112, wherein said modulating means comprises a magneto-optic device and said field comprises a magnetic field.

126. The system according to claim 112, wherein a portion of said optical energy within the lasing system is supplied to said inputting means for increasing the energy of said output of said cavity and thereby causing more energy to be fed to said inputting means, whereby said laser system changes from a high resonance state to a low resonance state.

127. The system according to claim 112, wherein said varying means modulates said applied waveform so that the lasing system resonance is increased to a first value of Q then, after a predetermined time interval, decreased to a second value of Q and, after a second predetermined time interval, increased to a third value of Q, said time intervals being short in comparison to the transit time of the light in said lasing cavity whereby said cavity produces a controlled output signal.

128. The optical-to-optical modulator according to claim 112, wherein said switches further comprise means for modulating said electromagnetic waveform, wherein a predetermined time after said Q is increased to said first value, said resonance is decreased to a second value of Q in a time short compared to the transit time of the optical energy in the lasing system.

129. The system according to claim 112, wherein said varying means modulates said applied waveform so that the resonance of said lasing system is increased to a first value of Q then, after a predetermined time interval, decreased to a second value of Q, said interval being short in comparison to the transit time of the optical energy in the lasing cavity whereby the optical energy within the lasing system is cavity dumped.

130. The system according to claim 112, wherein said varying means modulates said electromagnetic waveform so that the resonance of the lasing system is decreased from a first value of Q to a second value of Q and increased to a third value of Q in a time interval short in comparison to the transit time of the optical energy within the lasing system whereby the lasing system produces a controlled output signal.

131. The system according to claim 112, wherein said varying means modulates said electromagnetic waveform so that the resonance of the lasing system is decreased from a first value of Q to a second value of Q in a time short compared to the transit time of the optical energy within the lasing system whereby the optical energy within the lasing system is cavity dumped.

132. The laser system according to claim 112 further comprising a feedback loop, wherein at least a portion of the light emitted from said lasing cavity is used to control a first of said at least two light activated semiconductor switches, said first switch having a short carrier lifetime whereby said laser is caused to mode-lock.

133. The laser system according to claim 132 further comprising a second light activated semiconductor switch connected in parallel with said first switch; said second switch having a carrier lifetime which is slow relative to said first switch, for cavity dumping said laser system and for producing a controlled output therefrom.

134. The laser system according to claim 133, wherein said second switch is controlled by an input signal selected from the group consisting of: at least a portion of the laser cavity output; optical energy from within said laser cavity; and an external source of optical energy.

135. A method of controlling an optical-to-optical modulator, said modulator being connected to and forming a part of a transmission line including a dielectric, at least a portion of which is formed of an electro-optic material, a pair of conductors and at least one light activated switch responsive to an optical input control signal and positioned on said electro-optic material between segments of one of said pair of conductors, comprising the steps of:
  passing optical energy through said modulator;
  generating an electromagnetic waveform using said transmission line and said at least one light activated switch;
  controlling said electromagnetic waveform with said optical input control signal in order to selectively vary said electromagnetic waveform;
  impressing said electromagnetic waveform on said modulator; and
  modulating the optical energy passing through said optical-to-optical modulator based on said impressed electromagnetic waveform.

136. The method according to claim 135, wherein said step of modulating comprises the step of modulating an amplitude of said optical energy passing through said modulator.

137. The method according to claim 135, wherein said step of modulating comprises the step of modulating a phase of said optical energy passing through said modulator.

138. The method according to claim 135, wherein said step of modulating comprises the step of modulating a polarization of said optical energy passing through said modulator.

139. The method according to claim 135, wherein said transmission line includes a plurality of light activated switches, each of said light activated switches being controlled by an optical input control signal, and wherein said step of controlling said electromagnetic waveform further comprises the step of selectively controlling said plurality of light activated switches by means of said optical input control signals.

140. The method according to claim 139, wherein said transmission line includes a plurality of voltage sources in the form of charged transmission line segments, each of said transmission line segments being separated from an adjacent segment by one of said light activated switches, and wherein said step of controlling further comprises the step selectively controlling said light activated switches by means of said optical input control signals to thereby generate an electromagnetic waveform for controllably modulating the light energy passing through said modulator.

141. The method according to claim 140, wherein said step of controlling further comprises the step of selectively controlling at least one of said voltage sources for varying said electromagnetic waveform.

142. The method according to claim 135, wherein said modulator comprises at least two sections and said method further comprises the step of independently modulating the optical energy passing through said at least two sections.

143. The method according to claim 135, further comprising the step of deriving a feedback signal from at least a portion of the light which has passed through said modulator and using said feedback signal as at least a portion of said optical input signal.

144. The method according to claim 143, further comprising the step of modulating said feedback signal.

145. The method according to claim 135, further comprising the step of deriving a feedforward signal based on a portion of the light to be passed through the modulator using said feedforward signal to form at least a portion of said optical input signal.

146. The method according to claim 145, further comprising the step of modulating said feedforward signal.

147. A method of controlling an optical-to-optical modulator, said optical-to-optical modulator being connected to and forming a part of a transmission line including a dielectric, at least a portion of which is formed of an electro-optic material, a pair of conductors and at least two light activated switches responsive to an optical input control signal, comprising the steps of:
  passing optical energy through said modulator;

generating an electromagnetic waveform by means of said transmission line and said at least two light activated switches;

controlling said electromagnetic waveform by means of said optical input control signal in order to selectively vary said electromagnetic waveform;

impressing said electromagnetic waveform on said modulator; and modulating the optical energy passing through said optical-to-optical modulator by means of said impressed electromagnetic waveform.

148. The method according to claim 147, wherein said step of modulating comprises the step of modulating an amplitude of said optical energy passing through said modulator.

149. The method according to claim 147, wherein said step of modulating comprises the step of modulating a phase of said optical energy passing through said modulator.

150. The method according to claim 147, wherein said step of modulating comprises the step of modulating a polarization of said optical energy passing through said modulator.

151. The method according to claim 147, wherein said transmission line includes a plurality of light activated switches, each of said light activated switches being responsive to an optical input control signal, and wherein said step of controlling said electromagnetic waveform further comprises the step of selectively controlling said plurality of light activated switches by means of said optical input control signals.

152. The method according to claim 151, wherein said transmission line includes a plurality of voltage sources in the form of charged transmission line segments, each of said transmission line segments being separated from an adjacent segment by one of said light activated switches, and wherein said step of controlling further comprises the step selectively controlling said light activated switches by means of said optical input control signals to thereby generate an electromagnetic waveform for controllably modulating the light energy passing through said modulator.

153. The method according to claim 152, wherein said step of controlling further comprises the step of selectively controlling at least one of said voltage sources for varying said electromagnetic waveform.

154. The method according to claim 147, wherein said modulator comprises at least two sections and said method further comprises the step of independently modulating the optical energy passing through said at least two sections.

155. The method according to claim 147, further comprising the step of deriving a feedback signal from at least a portion of the light which has passed through said modulator and using said feedback signal as at least a portion of said optical input signal.

156. The method according to claim 155, further comprising the step of modulating said feedback signal.

157. The method according to claim 155, wherein said feedback signal comprises an input for a first of said light activated semiconductor switches, said first switch having a fast carrier lifetime, whereby said step of deriving a feedback signal further comprises mode-locking said modulator to the frequency of the feedback signal.

158. The method according to claim 147, further comprising the step of deriving a feedforward signal based on a portion of the light to be passed through the modulator using said feedforward signal to form at least a portion of said optical input signal.

159. The method according to claim 157, wherein a second light activated semiconductor switch is connected across said modulator in parallel with said first switch, said second switch having a carrier lifetime which is long relative to the carrier lifetime of said first switch, and further comprising the step of inputting a control signal to said switch for cavity dumping a laser cavity or for producing a controlled output therefrom.

160. The method according to claim 158, further comprising the step of modulating said feedforward signal.

161. A method for generating a modulated optical output using an optical-to-optical modulator disposed within a lasing system having a lasing axis and positioned along said lasing axis, said modulator being connected to and forming a part of a transmission line having at least one light activated switch responsive to an optical control signal, said method comprising the steps of:

passing optical energy along said lasing axis through said modulator;

generating an electromagnetic waveform using said transmission line and at least one light activated switch;

controlling said electromagnetic waveform with said optical input control signal in order to selectively vary said electromagnetic waveform;

impressing said electromagnetic waveform on said modulator;

modulating the optical energy of said lasing system passing along said lasing axis with said optical-to-optical modulator to generate an optical output modulated in accordance with said impressed electromagnetic waveform.

162. The method according to claim 161, wherein said lasing system includes an optical cavity and said step of controlling comprises the step of using light from within said cavity as at least a portion of the optical input control signal.

163. The method according to claim 161, wherein said lasing system includes a polarizer disposed along said lasing axis and said step of controlling comprises the step of using light from said polarizer as at least a portion of the optical input control signal.

164. The method according to claim 161, wherein said lasing system includes an optical cavity and said step of controlling comprises the step of using light external to said cavity as at least a portion of said optical input control signal.

165. The method according to claim 164, wherein said step of using light from outside of said lasing system comprises the step of using light from an external light source.

166. The method according to claim 164, wherein said step of using light from outside of said lasing system comprises the step of using light from an output of said lasing system.

167. The method according to claim 161, wherein said lasing system includes an optical cavity and step of controlling said electromagnetic waveform comprises the step of using light from a plurality of locations as said optical input control signal, said locations comprising at least one location within said optical cavity and at least one location external to said optical cavity.

168. The method according to claim 161, wherein said step of generating further comprises the step of generating said electromagnetic waveform using a distributed transmission line, wherein said at least one light activated switch is integrally formed in said transmission line, and wherein said transmission line includes a dielectric which forms at least a portion of said optical-to-optical modulator.

169. The method according to claim 161, wherein said step of modulating comprises the step of modulating an amplitude of said optical energy within said lasing system.

170. The method according to claim 161, wherein said step of modulating comprises the step of modulating a phase of said optical energy within said lasing system.

171. The method according to claim 161, wherein said step of modulating comprises the step of modulating a polarization of said optical energy within said lasing system.

172. The method according to claim 161, wherein said transmission line includes a plurality of light activated switches, each of said light activated switches being controlled by an optical input control signal, and wherein said step of controlling said electromagnetic waveform further comprises the step of selectively controlling said plurality of light activated switches by means of said optical input control signals.

173. The method according to claim 161, wherein said transmission includes a plurality of light activated switches and a plurality of voltage sources in the form of charged transmission line segments, each of said transmission line segments being separated from an adjacent segment by one of said light activated switches, and wherein the step of controlling further comprises the step selectively controlling said light activated switches by means of said optical input control signals to thereby generate an electromagnetic waveform for controllably modulating the light energy passing through said modulator.

174. The method according to claim 173, further comprising at least one voltage source connected to said transmission line, wherein the step of controlling further comprises selectively varying said variable voltage source to selectively control said electromagnetic waveform.

175. The method according to claim 161, wherein said step of controlling comprises the step of modulating said electromagnetic waveform to increase the Q of said lasing system.

176. The method according to claim 175, wherein said step of controlling further comprises the step of further modulating said electromagnetic waveform at a predetermined time after said Q is increased to decrease the value of Q of said lasing system and then increase the value of Q of the lasing system, said modulating being done in a time interval which is short in comparison to the transit time of the optical energy in the lasing system whereby the lasing system produces a controlled output signal.

177. The method according to claim 175, wherein said step of controlling further comprises the step of further modulating said electromagnetic waveform at a predetermined time after said Q is increased to decrease the value of Q in a time short in comparison to the transit time of the optical energy in the lasing system whereby the optical energy within the lasing system is cavity dumped.

178. The method according to claim 175, wherein said step of controlling said electromagnetic waveform further comprises the step of feeding at least a portion of the pulsed energy light from an output of said lasing system in the form of pulses to said at least one light activated switch for causing said lasing system to mode-lock to the frequency of said pulses.

179. The method according to claim 178, wherein said step of controlling further comprises the step of further modulating said electromagnetic waveform at a time after said lasing system mode-locks to decrease the value of Q of said lasing system and to thereafter increase the value of Q, said further modulating being done in a time interval short in comparison to the transit time of the optical energy in the lasing system whereby the lasing system produces a controlled output signal.

180. The method according to claim 178, wherein said step of controlling further comprises the step of modulating said electromagnetic waveform at a time after said lasing system mode-locks so that the Q of said lasing system is decreased in a time interval short in comparison to the transit time of the optical energy in the lasing system whereby the optical energy within the lasing system is cavity dumped.

181. The method according to claim 175, wherein said step of controlling said electromagnetic waveform comprises the step of modulating said electromagnetic waveform to cause said lasing system to mode-lock to the frequency of the modulated electromagnetic waveform.

182. The method according to claim 181, wherein said step of controlling further comprises the step of further modulating said electromagnetic waveform at a time after said lasing system mode-locks to decrease the value of Q of said lasing system and to thereafter increase the value of Q, said further modulating being done in a time interval short in comparison to the transit time of the optical energy in the lasing system whereby the lasing system produces a controlled output signal.

183. The method according to claim 181, wherein said step of controlling further comprises the step of modulating said electromagnetic waveform at a time after said lasing system mode-locks so that the Q of said lasing system is decreased in a time interval short in comparison to the transit time of the optical energy in the lasing system whereby the optical energy within the lasing system is cavity dumped.

184. The method according to claim 161, wherein said step of controlling said electromagnetic waveform further comprises the step of feeding pulses of light derived from an output of said lasing system to said at least one light activated switch to cause said lasing system to mode-lock to the frequency of said pulses.

185. The method according to claim 161, wherein said step of controlling said electromagnetic waveform comprises the step of modulating said electromagnetic waveform to cause said lasing system to mode-lock to the frequency of the modulated electromagnetic waveform.

186. The method according to claim 185, wherein said step of controlling said electromagnetic waveform comprises the step of further modulating said electromagnetic waveform to decrease the value of Q of said lasing system and to thereafter increase the value of Q, said further modulating being done in a time interval short in comparison to the transit time of the optical energy in the lasing system whereby the lasing system produces a controlled output signal.

187. The method according to claim 185, wherein said step of controlling said electromagnetic waveform comprises the step to modulating said electromagnetic waveform so that the Q of said lasing system is decreased in a time interval short in comparison to the transit time of the optical energy in the lasing system whereby the optical energy within the lasing system is cavity dumped.

188. The method according to claim 161, wherein said step of controlling said electromagnetic waveform comprises the step of further modulating said electromagnetic waveform to decrease the value of Q of said lasing system and to thereafter increase the value of Q, said further modulating being done in a time interval short in comparison to the transit time of the optical energy in the lasing system whereby the lasing system produces a controlled output signal.

189. The method according to claim 161, wherein said step of controlling said electromagnetic waveform comprises the step to modulating said electromagnetic waveform so that the Q of said lasing system is decreased in a time interval short in comparison to the transit time of the optical energy in the lasing system whereby the optical energy within the lasing system is cavity dumped.

190. The method according to claim 161, wherein said lasing system includes an optical cavity and said at least one light activated switch comprises a plurality of light activated switches and said step of controlling further comprises the step of controlling at least one of said switches using light from a source external to said optical cavity and controlling at least a second of said switches using light from within said optical cavity.

191. The method according to claim 189, comprising the step of further modulating the value of Q in a time interval less than the transit time of the optical energy in the lasing system, whereby the lasing system produces a controlled output.

192. The method according to claim 161, wherein said lasing system includes an optical cavity and said at least one light activated switch comprises a plurality of light activated switches and said step of controlling further comprises the step of controlling at least one of said switches using light from a source external to said optical cavity and controlling at least a second one of said switches with light from an output of said lasing system.

193. The method according to claim 161, wherein said lasing system includes an optical cavity and said at least one light activated switch comprises a plurality of light activated switches and said step of controlling further comprises the step of controlling at least one of said switches using light from a source external to said optical cavity and controlling at least a second one of said switches using light from said external source delayed by a predetermined time after said at least one switch receives said light.

194. The method according to claim 161, wherein said lasing system includes an optical cavity and said step of modulating comprises the step of modulating a plurality of beams of optical energy, at least one of said beams being external to said optical cavity.

195. The method according to claim 194, wherein said step of modulating said at least one beam comprises the step of modulating the output of said lasing system.

196. The method according to claim 194, wherein said modulator comprises at least two sections, each having a beam of optical energy passing therethrough, and said method further comprises the step of independently modulating the beam of optical energy passing through each of said at least two sections.

197. The method according to claim 194, further comprising the step of generating a plurality of electromagnetic waveforms, and wherein said step of modulating comprises the step of individually modulating each of said plurality of beams in accordance with a respective one of said plurality of electromagnetic waveforms.

198. The method according to claim 194, wherein said step of modulating comprises the step of modulating said plurality of beams in accordance with said electromagnetic waveform.

* * * * *